US011185920B2

(12) United States Patent
Murphy et al.

(10) Patent No.: US 11,185,920 B2
(45) Date of Patent: Nov. 30, 2021

(54) METHODS AND SYSTEMS FOR MAKING METAL-CONTAINING PARTICLES

(71) Applicant: Hammond Group, Inc., Hammond, IN (US)

(72) Inventors: Terrence Hyde Murphy, Chicago, IL (US); William Peter Wilke, IV, Saint John, IN (US); Philip Michael Kowalski, Wanatah, IN (US)

(73) Assignee: Hammond Group, Inc., Hammond, IN (US)

( * ) Notice: Subject to any disclaimer, the term of this patent is extended or adjusted under 35 U.S.C. 154(b) by 201 days.

(21) Appl. No.: 16/230,093

(22) Filed: Dec. 21, 2018

(65) Prior Publication Data
US 2019/0217392 A1    Jul. 18, 2019

Related U.S. Application Data

(60) Provisional application No. 62/616,593, filed on Jan. 12, 2018, provisional application No. 62/743,698, filed on Oct. 10, 2018.

(51) Int. Cl.
*B22F 9/08* (2006.01)
*C01G 21/06* (2006.01)
(Continued)

(52) U.S. Cl.
CPC .............. *B22F 9/082* (2013.01); *B22F 9/26* (2013.01); *C01G 21/06* (2013.01); *C22C 1/053* (2013.01);
(Continued)

(58) Field of Classification Search
None
See application file for complete search history.

(56) References Cited

U.S. PATENT DOCUMENTS 2,235,487 A   3/1941  Mayer
2,383,220 A   6/1942  Seabury et al.
(Continued)

FOREIGN PATENT DOCUMENTS

AT    242257 T    6/2003
DE    328044      12/1920
(Continued)

OTHER PUBLICATIONS

Graco, Inc., "Atomization Concept and Theory", Form No. 321-027 Aug. 1995, 1995.
(Continued)

*Primary Examiner* — George Wyszomierski
(74) *Attorney, Agent, or Firm* — Dinsmore & Shohl LLP

(57) ABSTRACT

According to one or more embodiments presently described, metal-containing particles may be made by a method that includes introducing a molten material into a reaction zone of a reactor system, passing a process gas into the reaction zone in a direction substantially tangential to a sidewall of the reaction zone, and contacting the process gas with the molten material in the reaction zone to form metal-containing particles. The molten material may be introduced into an upper portion of the reaction zone The reaction zone may include a substantially circular cross-section, and the molten metal may be introduced into the reaction zone in a laminar flow or as atomized particles.

13 Claims, 16 Drawing Sheets

(51) Int. Cl.
| | |
|---|---|
| *H01M 4/56* | (2006.01) |
| *C22C 1/05* | (2006.01) |
| *B22F 9/26* | (2006.01) |
| *H01M 4/36* | (2006.01) |
| *H01M 4/57* | (2006.01) |
| *H01M 10/06* | (2006.01) |
| *C22C 1/10* | (2006.01) |

(52) U.S. Cl.
CPC ............ *H01M 4/364* (2013.01); *H01M 4/56* (2013.01); *H01M 4/57* (2013.01); *H01M 10/06* (2013.01); *B22F 2009/0824* (2013.01); *B22F 2009/0848* (2013.01); *B22F 2009/0876* (2013.01); *B22F 2301/30* (2013.01); *B22F 2302/25* (2013.01); *B22F 2999/00* (2013.01); *C01P 2002/30* (2013.01); *C01P 2004/51* (2013.01); *C01P 2004/61* (2013.01); *C01P 2006/12* (2013.01); *C01P 2006/60* (2013.01); *C22C 1/1042* (2013.01)

(56) References Cited

U.S. PATENT DOCUMENTS

| | | | |
|---|---|---|---|
| 2,968,062 | A | 1/1961 | Probst et al. |
| 2,984,544 | A | 5/1961 | Joly |
| 3,094,428 | A | 6/1963 | Hamilton et al. |
| 3,297,411 | A | 1/1967 | Dear |
| 3,322,496 | A | 5/1967 | Vahrenkamp et al. |
| 3,450,503 | A | 6/1969 | Knorr |
| 3,501,802 | A * | 3/1970 | Lecznar ................. B22F 9/082 425/7 |
| 3,791,813 | A | 1/1974 | Ramachandran et al. |
| 4,385,929 | A | 5/1983 | Ichidate et al. |
| 4,450,885 | A | 5/1984 | Sugahara et al. |
| 4,521,399 | A | 6/1985 | McKinney |
| 4,536,385 | A | 8/1985 | Heubach et al. |
| 4,619,845 | A | 10/1986 | Ayers et al. |
| 4,787,935 | A * | 11/1988 | Eylon ...................... B22F 9/08 425/7 |
| 4,988,464 | A | 1/1991 | Riley |
| 5,087,292 | A | 2/1992 | Garrido |
| 5,125,574 | A | 6/1992 | Anderson et al. |
| 5,244,369 | A | 9/1993 | Miller et al. |
| 5,277,705 | A * | 1/1994 | Anderson ............. B01D 45/12 55/319 |
| 5,403,375 | A * | 4/1995 | Konig ................... B22F 1/0014 420/430 |
| 5,651,952 | A | 7/1997 | Grudnoff et al. |
| 6,254,661 | B1 * | 7/2001 | Takeda ................... B22F 9/082 75/337 |
| 6,334,884 | B1 | 1/2002 | Tornberg |
| 6,398,125 | B1 | 6/2002 | Liu et al. |
| 6,772,961 | B2 | 8/2004 | Forbes Jones et al. |
| 6,786,950 | B2 | 9/2004 | Yadav et al. |
| 7,128,852 | B2 | 10/2006 | Hampden-Smith et al. |
| 7,169,209 | B2 | 1/2007 | Nakata et al. |
| 7,198,657 | B2 | 4/2007 | Tornberg |
| 7,354,471 | B2 | 4/2008 | Hampden-Smith et al. |
| 7,374,598 | B2 | 5/2008 | Forbes Jones et al. |
| 7,384,447 | B2 | 6/2008 | Kodas et al. |
| 7,510,693 | B2 | 3/2009 | Katusic et al. |
| 7,572,423 | B2 | 8/2009 | Kutsovsky |
| 7,628,838 | B2 | 12/2009 | Walter et al. |
| 7,900,435 | B1 | 3/2011 | Greason et al. |
| 8,029,596 | B2 | 10/2011 | Arrell et al. |
| 8,535,633 | B2 | 9/2013 | Schumacher et al. |
| 9,079,774 | B2 | 7/2015 | Chaumonnot et al. |
| 9,421,612 | B2 | 8/2016 | Fang et al. |
| 10,130,994 | B2 | 11/2018 | Fang et al. |
| 2002/0134198 | A1 | 9/2002 | Edlinger |
| 2008/0145657 | A1 * | 6/2008 | Igarashi ................. F23D 14/32 428/402 |
| 2010/0045841 | A1 | 2/2010 | Otsuka et al. |
| 2016/0036099 | A1 | 2/2016 | Ellis |
| 2017/0165795 | A1 | 6/2017 | Lenczowski |
| 2017/0317351 | A1 | 11/2017 | Prengaman et al. |
| 2018/0207617 | A1 | 7/2018 | Fischer et al. |

FOREIGN PATENT DOCUMENTS

| | | |
|---|---|---|
| DE | 1268123 B | 5/1968 |
| DE | 19544603 A1 | 6/1997 |
| EP | 0704408 A1 | 4/1996 |
| EP | 1327491 A1 | 7/2003 |
| EP | 1474224 B1 | 6/2005 |
| EP | 1688394 A2 | 8/2006 |
| EP | 1785395 A1 | 5/2007 |
| EP | 1296772 B1 | 9/2009 |
| EP | 227435 B1 | 7/2012 |
| EP | 3181711 A1 | 6/2017 |
| EP | 3424883 A1 | 1/2019 |
| EP | 1565400 B1 | 4/2019 |
| FR | 2929264 A1 | 10/2009 |
| GB | 841884 | 7/1960 |
| GB | 2094286 A | 9/1982 |
| WO | 2004048261 A2 | 6/2004 |
| WO | 2015175726 A1 | 11/2015 |
| WO | 2019007782 A1 | 1/2019 |
| WO | 2019024420 A1 | 2/2019 |

OTHER PUBLICATIONS

Lefevre, "Atomization", Home Semantic Map A-Z Index Visual Gallery by Thermopedia, Feb. 3, 2011.
Schwaneke et al., "Surface Tension and Density of Liquid Lead", Journal of Chemical and Engineering Data, vol. 17, No. 3, pp. 291-293, 1972.
Sofuoglu, "Design of a Nozzle for the Production of Metal Powder via Gaws Atomization", Proceedings of ASME 2013 International Mechanical Engineering Congress & Exposition, Nov. 15-21, 2013.
NASA, "Triaxial Swirler Liquid Injector Development, Phas I Project", Techport, SBIR/STTR Programs, Space Technology Mission Directorate (STMD), 2005.
Thresh et al., "The Viscosities of Lead, Tin, and Pb—Sn Alloys", Metallurgical Transactions, vol. 1, pp. 1531-1532, Jun. 1970.
Uhlenwinkel et al., "A new Technique for Molten Metal Atomization", https://www.researchgate.net/publication/268202018, Jan. 30, 2015.
White, "The Surface Tensions of Pb, Sn, and Pb—Sn Alloys", Metallurgical Transactions, vol. 2, pp. 3067-3068, Nov. 1971.
Search Report and Written Opinion pertaining to International Application No. PCT/US2019/013198 dated Mar. 7, 2019.
Search Report and Written Opinion pertaining to International Application No. PCT/US2019/013214 dated Mar. 7, 2019.
Search Report and Written Opinion pertaining to International Application No. PCT/US2019/013217 dated Mar. 7, 2019.
Search Report and Written Opinion pertaining to International Application No. PCT/US2019/013221 dated Mar. 25, 2019.
Non-Final Office Action pertaining to U.S. Appl. No. 16/230,061 dated Nov. 3, 2020 (25 pages).
Non-Final Office Action pertaining to U.S. Appl. No. 16/230,061 dated May 4, 2021 (13 pages).
Perry, D.L. et al., "Synthesis of high purity a- and 13-PbO and possible applications to synthesis and processing of other lead oxide materials", Applied Physics A, vol. 89, pp. 77-80, published online Jun. 16, 2007.
Non-Final Office Action pertaining to U.S. Appl. No. 16/230,082 dated Feb. 25, 2021 (28 pages).
Non-Final Office Action pertaining to U.S. Appl. No. 16/230,102 dated Dec. 22, 2020 (31 pages).
Final Office Action pertaining to U.S. Appl. No. 16/230,102 dated May 21, 2021 (21 pages).

* cited by examiner

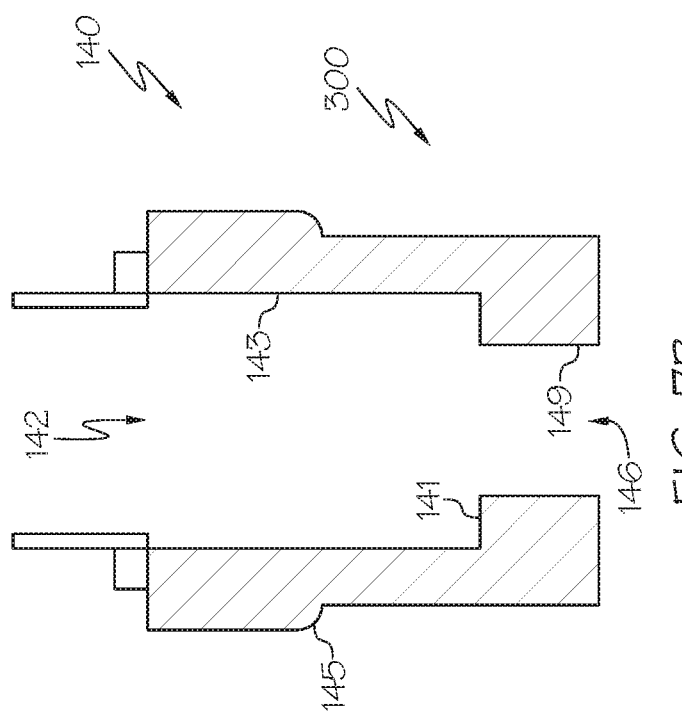

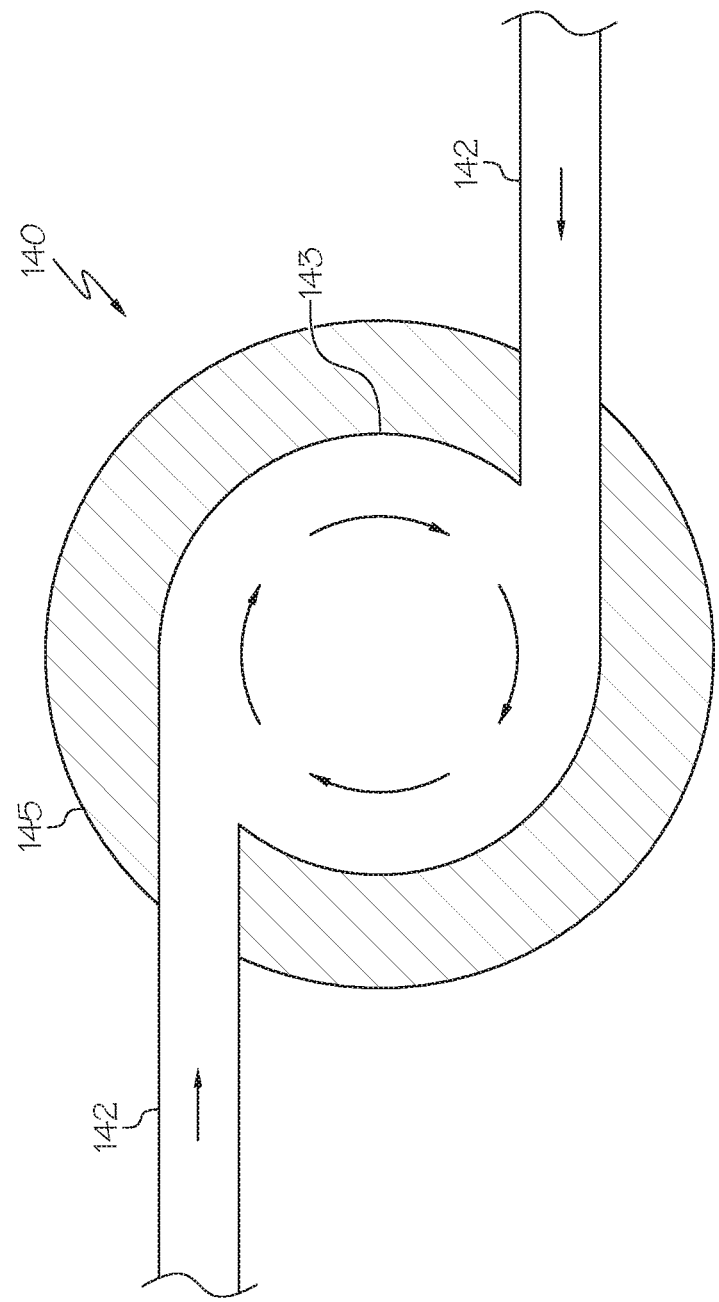

METHODS AND SYSTEMS FOR MAKING METAL-CONTAINING PARTICLES

CROSS-REFERENCE TO RELATED CASES

The present application claims priority to U.S. Provisional Application No. 62/616,593, filed Jan. 12, 2018, entitled "METHODS AND SYSTEMS FOR PRODUCING METAL-CONTAINING PARTICLES", and claims priority to U.S. Provisional Patent Application Ser. No. 62/743,698, filed Oct. 10, 2018, entitled "METHODS AND SYSTEMS FOR PRODUCING METAL-CONTAINING PARTICLES", each of which are incorporated by reference in their entirety herein.

BACKGROUND

Field

The present disclosure relates to methods and systems for producing metal-containing particles and, more particularly, to methods and systems for converting source metal-containing materials into metal-containing solid particles.

Technical Background

Powdered pure metals and/or metal oxides are utilized in a wide variety of manufacturing and material formation. For example, mixtures of lead oxide and pure lead may be utilized in the manufacture of lead acid batteries. Other metal powders may be utilized in the formation of bulk metals and tools, such as through sintering or other alloy formation techniques. Additionally, pure or alloy metal particles may be utilized as additives in paints, coatings, lubricants, or X-Ray shielding.

BRIEF SUMMARY

Accordingly, there is a need for improved methods and systems for making such particles. One or more of the presently disclosed embodiments relate to systems and/or methods for processing metal-containing materials into particle-sized, metal-containing materials (e.g., powders) having either the same or a different chemical composition as the source metal-containing material. For example, molten feed metals may be processed into solid particulates of pure metals, alloys, or metal oxides. In one or more embodiments, metals such as lead may be chemically processed by changing the composition (such as into lead oxide) or may be physically changed by changing the shape, size, or crystal structure. For example, lead metal may be processed to form powdered lead oxides having one or more crystal morphologies through mechanical and chemical means. The formation of non-lead metals and metal oxides is also contemplated by the presently disclosed methods and systems.

According to one or more embodiments, metal-containing particles may be made by a method comprising introducing a molten material into a reaction zone of a reactor system, passing a process gas into the reaction zone in a direction substantially tangential to a sidewall of the reaction zone, and contacting the process gas with the molten material in the reaction zone to form metal-containing particles. The molten material may be introduced into an upper portion of the reaction zone The reaction zone may comprise a substantially circular cross-section, and the molten metal may be introduced into the reaction zone in a laminar flow or as atomized particles.

According to one or more additional embodiments, a reactor system for forming metal-containing particles may comprise a reaction zone comprising a circular cross-section, an injector operable to pass molten metal into the reaction zone through an upper portion of the reaction zone, a process gas inlet through which process gas is passed into the reaction vessel, and a separation zone downstream of the reaction vessel. The injector may be operable to introduce the molten metal material in a laminar flow or as atomized molten particles in the upper region of the reaction zone in a downward direction. The process gas inlet may be positioned substantially tangentially to a sidewall of the reaction zone such that the process gas enters the reaction vessel tangentially around a perimeter of the reaction zone. The separation zone may comprise a gas outlet and a solids outlet.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 7B schematically depicts a cross-sectional side view of a single-conduit injector, according to one or more embodiments described herein;

FIG. 8 schematically depicts a top-down view of the atomization nozzle of FIG. 6 or 7A, according to one or more embodiments described herein;

Figure 13:
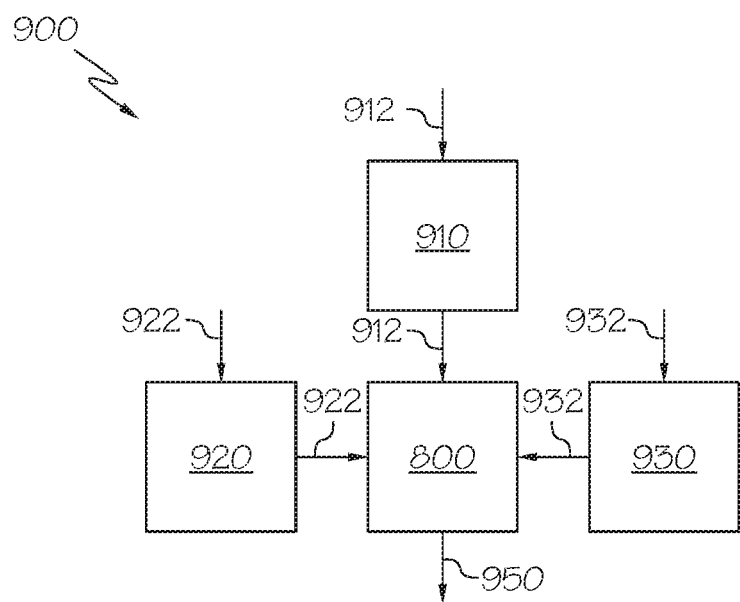
FIG. 13 schematically depicts a reactor system that includes a multi-conduit reactor, according to one or more embodiments described in this disclosure.

It should further be noted that in some figures, such as FIG. 13, arrows in the drawings may refer to process streams. However, the arrows may equivalently refer to transfer lines which may serve to transfer process steams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a system product stream which exits the depicted system or a system inlet stream which enters the depicted system. System product streams may be further processed in accompanying chemical processing systems or may be commercialized as end products. System inlet streams may be streams transferred from accompanying chemical processing systems or may be non-processed feedstock materials.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

For the purpose of describing the simplified schematic illustrations and descriptions of FIGS. 1-13, the numerous valves, temperature sensors, electronic controllers and the like that may be employed and well known to those of ordinary skill in the art of certain chemical processing operations are not included. Further, accompanying components that are often included in conventional chemical processing operations are not depicted. It should be understood that these components are within the spirit and scope of the present embodiments disclosed. However, operational components, such as those described in the present disclosure, may be added to the embodiments described in this disclosure.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

The present application, according to one or more embodiments, is directed to methods and/or systems utilized in the formation of metal-containing particles. It has been discovered that the introduction of a molten metal-containing material in an atomized form (i.e., comprising liquid particles), or with a laminar flow, may have several advantages for producing metal-containing particles as compared with conventional methods which generally utilize the introduction of a bulk liquid stream of molten metal-containing material into a reactor such as a Barton. For example, conventional processes may utilize the introduction of molten material into a reactor from the end of a pipe in a non-laminar, turbulent flow. For example, according to one or more embodiments disclosed herein, the introduction of the molten metal-containing material in an atomized or laminar form may provide more reactive surface area, and therefore enhance the oxidation rate of reaction, and correspondingly enhance the production rate of metal oxides, such as lead oxide. The incorporation of a controlled, atomized or laminar molten feed stream into the reactor may enhance control of the physical characteristics (e.g., particle size), chemical characteristics (e.g., average oxidation state, crystal morphology) and/or the product manufacturing rates of the metal-containing particles. For example, it is contemplated that atomization of a molten metal-containing material may be performed by injection of the molten metal-containing material from an atomizing injector which may directly atomize the molten metal-containing material when it is passed out of a nozzle (for example, a misting nozzle), or may pass a laminar flow of molten metal-containing material out of a nozzle which is subsequently atomized by impingement with a flow of relatively high velocity gas. In other embodiments, a laminar flow of molten metal-containing material may improve process output as compared with a similar process that introduces the molten metal-containing material through a conventional pipe source. Additionally, the molten metal-containing material may be passed from a nozzle in a laminar flow pattern which increases the surface area to volume ratio of the molten metal-containing material, allowing for increased contact with surrounding gasses. For example, a hollow cone laminar flow pattern may be utilized which increases the surface to volume ratio of the molten metal-containing material as it is expelled from the injector and enters the reactor. In additional embodiments the laminar flow pattern may sufficiently increase the surface area to volume ratio of the molten metal-containing material (as compared with introduction by a pipe or simple trough overflow scheme) such that when the laminar molten metal-containing material is contacted by an agitator it atomizes. These and other aspects of the presently disclosed technology are described herein in the context of systems and methods which may be utilized to form metal-containing particles.

According to one or more embodiments, by any of the methods or systems presently disclosed, a mixture of lead metal particles (sometimes called "free lead") and lead oxide particles may be formed. In some embodiments presently disclosed, the weight ratio of formed solid lead oxide particles to solid lead metal particles may be less than 99:1. For example, the particles formed by the presently disclosed methods may have a weight ratio of formed solid lead oxide particles to solid lead metal particles of from 50:50 to 99:1 (such as from 50:50 to 60:40, from 60:40 to 70:30, from 70:30 to 80:20, from 80:20 to 90:10, or from 90:10 to 99:1, or combinations thereof) any combination thereof). In additional embodiments, the weight ratio of formed solid lead oxide particles to solid lead metal particles may be from 50:50 to 90:10, such as form 50:50 to 85:15. Such ratios may be well suited for lead acid batteries. However, it is contemplated that other ratios may be utilized for lead acid batteries as well. In additional embodiments, a majority by weight of the product is metallic lead (e.g., the product comprises at least 75 wt. %, at least 90 wt. %, at least 95 wt. %, or even at least 99 wt. % of metallic lead particles (non-oxidized).

In one or more embodiments, the lead oxide formed may be majority by weight alpha lead oxide having a tetragonal crystal structure. For example, at least 50 wt. %, at least 60 wt. %, at least 70 wt. %, at least 80 wt. %, at least 90 wt. %, at least 99 wt. %, or even at least 99.9 wt. % of the formed lead oxide may be alpha lead oxide. In such embodiments, a minority of the formed lead oxide may be beta lead oxide having an orthorhombic crystal structure. For example, less than 50 wt. %, 40 wt. %, 30 wt. %, 20 wt. %, 10 wt. %, or even 1 wt. % of the formed lead oxide may be beta lead oxide. However, in additional embodiments, a majority by weight of beta lead oxide is contemplated. It should be understood that mixtures of free lead and lead oxide, where the majority by weight of the lead oxide is alpha lead oxide, may be suitable for lead acid batteries. For example, in one or more embodiments, the weight ratio of formed solid lead oxide particles to solid lead metal particles of from 50:50 to 99:1 and the majority by weight of the lead oxide may be alpha lead oxide. In additional embodiments, the weight ratio of formed solid lead oxide particles to solid lead metal particles of from 50:50 to 90:10 and at least 90 wt. %, or even 99 wt. % of the lead oxide may be alpha lead oxide.

In one or more embodiments, the reaction to form lead oxide may take place at from 621° F. (about the melting point of lead) to 850° F. or even to 880° F. (e.g., from 621° F. to 700° F., from 700° F. to 800° F., from 800° F. to 850° F., from 850° F. to 880° F., or combinations thereof). Such temperatures may be suitable for forming majority by weight alpha lead oxide and/or allowing for at least 1 wt. % of the product to remain as metallic lead (i.e., not converted to lead oxide). Without being bound by theory, it is believed the higher processing temperatures may lead to almost total conversion of lead to lead oxide (e.g., greater than 99 wt. % lead oxide as product) and/or the formation of majority by weight beta lead oxide. Such temperatures (from 621° F. to 880° F.) may be suitable for forming lead oxide which can be utilized in lead oxide batteries.

According to additional embodiments, a majority of the produced lead oxide is beta lead oxide. For example, at least 50 wt. %, at least 60 wt. %, at least 70 wt. %, at least 80 wt. %, at least 90 wt. %, at least 99 wt. %, or even at least 99.9 wt. % of the formed lead oxide may be beta lead oxide. In such embodiments, free lead may be present in the product in amounts of at least 1 wt. %, at least 2 wt. %, at least 5 wt. %, at least 10 wt. %, at least 20 wt. %, or even at least 50 wt. %. It is contemplated that reactor temperatures of greater than 880° F. may be utilized in some embodiments, such as when beta lead is a desired product.

It should be understood that one or more embodiments of the present disclosure are directed to molten material injectors (sometimes referred to herein as injector devices) that may be compatible for use with a Barton reactor. For example, according to some embodiments, a conventional Barton reactor that utilizes a non-atomized or non-laminar flow of molten metal-containing material into the conventional Barton pot (e.g., by passing the molten metal-containing material into the Barton pot through a stand pipe or the like) may be enhanced by retrofitting the conventional Barton reactor with the molten material injectors presently described herein. The use of the presently described molten material injectors may improve product output, among other desirable results. However, it is contemplated that the disclosed injectors may be incorporated into a wide variety of reactor types, of which several non-limiting examples are provided herein.

As described herein, "metal-containing" materials include any materials which comprise a metal or metalloid element. For example, metal-containing materials include metal oxides, metal alloys, or substantially pure metallic materials. Pure or near pure metals (e.g., those comprising at least 99 wt. %, 99.5 wt. %, 99.9 wt. %, or even 99.99 wt. % of a single element) may be referred to as "metallic," such as "metallic lead" or "metallic aluminum", etc., or simply as "metal," such as "lead metal" or "aluminum metal." Furthermore, as described herein, "pure metals" and "alloys" are non-oxidized (i.e., contain less than 1% of molecules oxidized). While the formation of particles comprising any metal-containing materials are presently contemplated in this disclosure, the conversion of lead to lead oxide is described with reference to several of the herein disclosed embodiments. As such, some embodiments disclosed herein may be described with respect to the production of lead oxide from metallic lead. However, it should be appreciated that similar methods and systems for the production of non-lead materials may be utilized within the scope of the present disclosure. By way of example, metals processed by the methods and systems disclosed herein may include lead, bismuth, aluminum, zinc, nickel, antimony, alloys thereof, and oxides thereof.

Additionally, as described herein, "particles" or "particulate form" may refer to solid or liquid matter in discrete bodies with diameters of 1000 microns or less (such as 500 microns or less, 400 microns or less, 300 microns or less, 200 microns or less, 100 microns or less, 50 microns, 25 microns or less, or even smaller). For example, the vast number of formed solid particles by the presently disclosed processes may fit through a No. 50 mesh US standard sieve and have a diameter of 300 microns or less. However, some particles may be much smaller than those having a diameter of 300 microns or less. For example, the $d_{50}$ of the particles formed by the presently disclosed processes may be from 1 to 5 microns, from 5 microns to 10 microns, from 10 microns to 25 microns, from 25 microns to 50 microns, from 50 microns to 100 microns, from 100 microns to 150 microns, from 150 microns to 200 microns, from 200 microns to 250 microns, from 250 microns to 300 microns, or any combination thereof. In one or more embodiments, a lead oxide particles may be formed where 95 wt. % of the lead oxide particles has a diameter of 100 microns or less. In one or more embodiments, a metallic lead particles may be formed where 95 wt. % of the lead particles have a diameter of 1000 microns or less. Molten materials in particle form may be referred to as "atomized," or being in an "atomized form." Also contemplated herein are embodiments where only a portion of the molten feed is atomized. It should be understood that "atomized" molten materials may refer to molten materials that are in particulate liquid or droplet form. For example, according to some embodiments, at least 50 vol. %, at least 60 vol. %, at least 70 vol. %, at least 90 vol. %, or even at least 95 vol. % of the molten material injected into the reactor may have be in discrete bodies having a diameter of 1000 micron or less.

As used herein, a "chemical change" refers to a change which affects the chemical composition of a material. For example oxidation of a metal or alloy in the feed stream to form a metal oxide is considered a chemical change. Additionally, as used herein, a "physical change" refers to a change affecting the form of a chemical substance, but not its chemical composition. Examples of physical changes include changes in size, shape, phase, etc. It should be understood that, in some embodiments, a chemical and physical change may take place. However, in other embodiments, a chemical change may not take place. For example, the contents of the feed stream may be powderized, but maintain their chemical composition. Without being bound by theory, it is believed that the contents of the fluid stream may at least partially determine whether a chemical change takes place. For example, a fluid stream comprising oxygen may allow for combustion, forming metal oxides, but an inert fluid stream such as nitrogen may not alter the composition of the metal or alloy in the feed stream, as will be discussed in detail herein. Additionally, without being bound by theory, it is believed that particular characteristics of the fluid stream, such as its momentum flux relative to that of the feed stream may atomize the metal or alloy present in the feed stream, resulting in the formation of powderized metals, alloys, and/or oxides thereof in the product stream.

As used herein, "atomizing" a material refers to converting a bulk material into fine particles or droplets. For example, a metal or alloy included in the feed stream may be atomized into fine particles when contacted by the fluid stream.

As compared with one or more embodiments of the presently disclosed systems, a conventional Barton reactor may be an inefficient atomizer (e.g., by means of its agitator blade as described subsequently herein), producing particles with a larger than desired particle size distribution. As described herein, a "conventional Barton" reactor refers to one which introduces molten metal by pipe, overflow or a trough, or similar means (i.e., not by the injectors presently disclosed). A "modified Barton" may be referred to herein and includes some means for introducing the molten metal in an atomized or laminar flow form. However, it should be understood that a "modified Barton" may refer to a Barton-style reactor which was not previously fitted with a pipe style injector and then retrofitted. For example, the present description is intended to include Barton reactors which were originally fitted with the injectors presently disclosed.

In one or more embodiments of conventional Barton operation, the agitator atomizes a portion of the lead feed in an atmosphere which allows the oxidation of lead particles. Some of the lead oxide remains in the bath until its particle size is small enough to allow it to be conveyed out of the reactor. When the conventional Barton reactor is operating in a steady state there is a mixing of lead and lead oxide which is also conducive to oxidation. Atomization may be needed to get rapid oxidation. Molten lead on the surface of the melt kettle oxidizes slowly over hours of operation. Molten lead from the injector does not appear to oxidize until the lead film breaks into small particles. As such, in one or more embodiments, the Barton agitator does atomize a significant portion of the lead feed but it is not an efficient atomizer and it produces a wider variation in particle size distribution by the nature of the lead feed and the lead feed's point of impact on the agitator. The presently disclosed embodiments may directly introduce the molten metal as a particulate or in laminar flow, which may generate greater contact and reaction between the molten materials and process fluids such as air.

Figure 1:
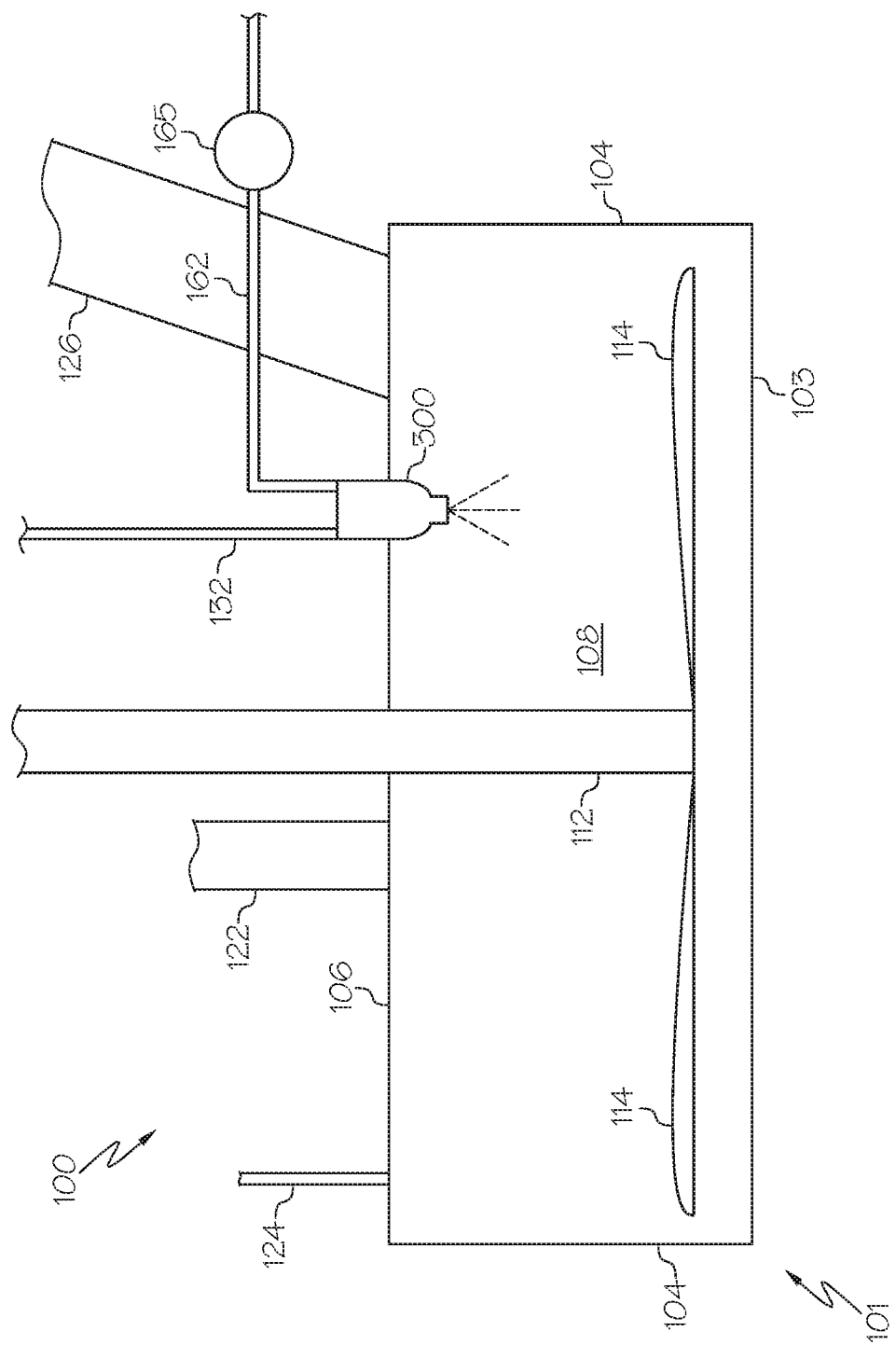
FIG. 1 schematically depicts a side view of a Barton-style system used for forming metal-containing particles, according to one or more embodiments described herein.

Referring now to FIG. 1, a modified Barton reactor system utilized to form metal-containing particles is depicted. According to one or more embodiments, the reactor system 100 may include a reactor 101, a molten material injector device 300, and a molten metal-containing material source 162. According to one or more embodiments, molten metal-containing material may be fed from the molten metal-containing material source 162 to the molten material injector device 300. The molten material injector device 300 may inject the molten metal-containing material into the reactor 101, where it is processed into solid metal-containing particles, such as lead particles, lead oxide particles, or both.

The molten metal-containing material source 162 may comprise piping which is fluidly connected to a melt kettle (not depicted in FIG. 1) or other apparatus which may melt solid metal-containing supply materials. For example, the melt kettle may melt solid metallic lead into molten lead. A valve may control the flow of the molten metal-containing material. In some embodiments, the molten material may be conveyed with a pump (such as a pump submerged in a melt kettle). In additional embodiments, the molten material may be conveyed by gravity alone, or at least in part. According to one or more embodiments, metal, such as lead, may be melted in the melt kettle to a temperature at or exceeding the metal's melting point, such as about 621° F. for lead, and less than that of the metals boiling point, such as about 3,180° F. for lead. Without limitation, in one embodiment, the molten material may be pumped from the melt kettle through a pipe directly to the molten material injector device 300.

Moreover, and as described herein, conventional Barton processes provide a stream of molten lead through a pipe, trough, or other like introduction device from a melting kettle leading to a Barton Reactor. A trough design may be similarly referred to as a "dam" or "lip" where molten metal spills over a raised wall and into the Barton or other reactor. In one or more embodiments presently described, such trough, dam, lip, or like device is not utilized. The molten lead flow in conventional Barton processes is typically controlled with a manual valve that is submerged in the melting kettle or a lead pump. Such a pump may be submerged below the surface of the molten metal adjacent to the area where bars of lead are fed into the melting kettle. The mass flow rate of molten lead feeding into the Barton reactor can be modified by controlling the pump's rpms. As the melt kettle is depleted of molten lead, it is replenished with solid bars of lead that subsequently melt and increase the level of molten lead. As the stream of molten lead is introduced into the Barton reactor, the distance between the end of the pipe and the Barton agitator may be relatively small and insufficient to allow the major portion of the fluid stream to break up and form molten lead droplets or atomize. Additionally, the relative velocity of the air surrounding the molten stream of lead is generally inadequate to promote atomization. Likewise, the mass flowrate of the molten lead stream is irregular and does not promote the formation of liquid droplets. Additionally, the process of repeatedly adding solid bars of lead into the melting kettle introduces both temperature and mass flow rate variation to the molten stream of lead. When a solid bar of lead is introduced into the melting kettle, the temperature of the molten lead drops as the solid lead component absorbs thermal energy. Once the solid lead has completely been melted, the temperature rises to a prescribed temperature. As the level of molten lead rises and falls, the head pressure at the lead pipe inlet changes and therefore continuously changes the mass flow rate of molten lead delivered to the Barton reactor. Such deficiencies may be overcome by the embodiments described herein.

Some embodiments, as depicted in FIG. 1, may utilize a molten material pump 165 to provide sufficiently pressurized molten metal-containing material to the molten material injector device. It should be appreciated that the system of FIG. 1 may operate with any of the molten material injector devices 300 described herein, and that the molten material pump 165 may be sufficient in one or more embodiments to maintain a relatively constant pressure of molten metal-containing material to the molten material injector device 300 such that the flow of molten metal-containing material into the reactor 101 is relatively constant and at a pressure sufficient to atomize and/or form a laminar flow pattern on the molten metal-containing material.

Figure 10:
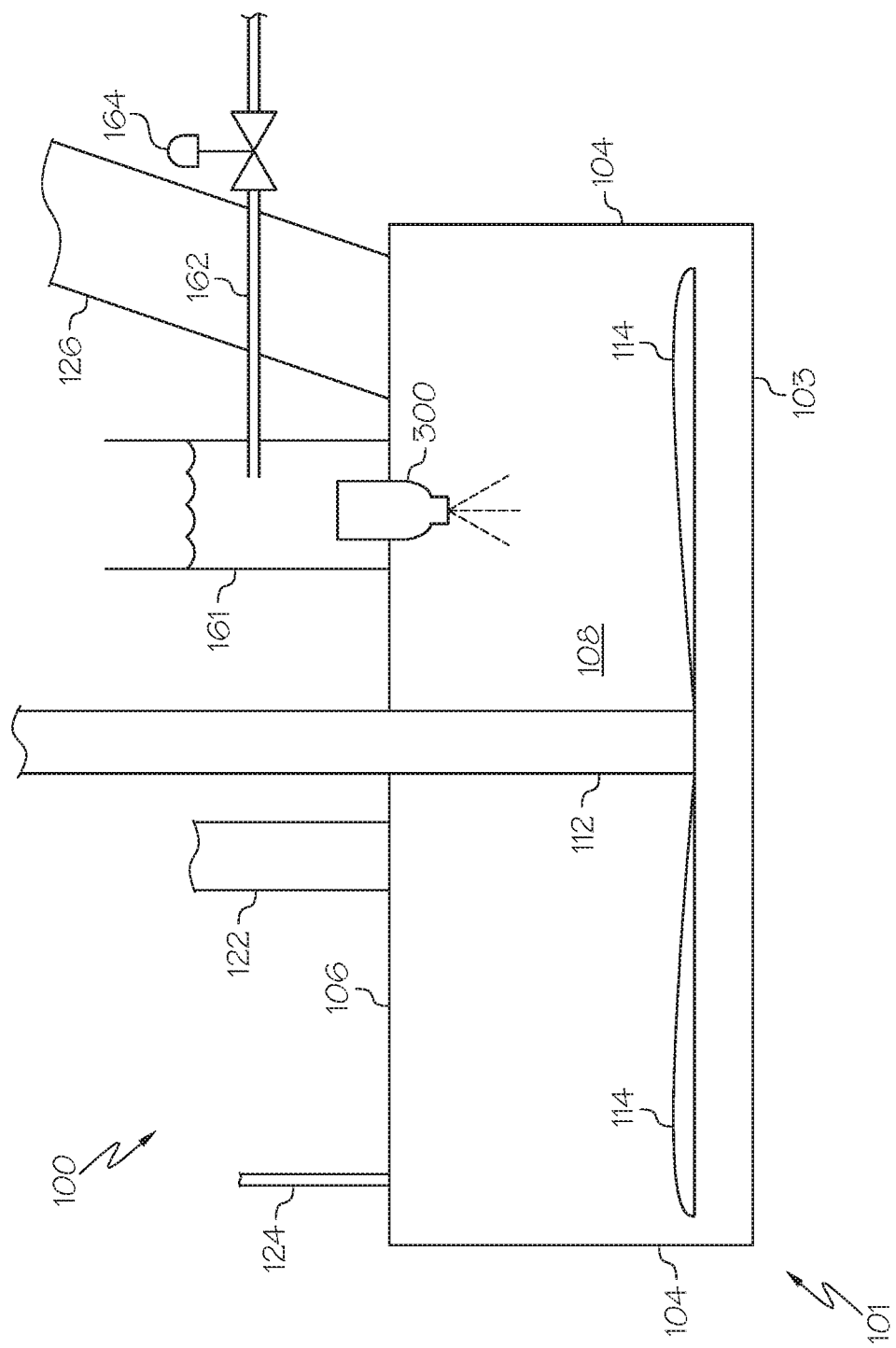
FIG. 10 schematically depicts a side view of a system used for forming metal-containing particles that includes a molten material reservoir, according to one or more embodiments described herein.

In some embodiments, the molten material injector device 300 may comprise a gas manifold, as described in additional detail hereinbelow. The air manifold may be directly connected to a gas supply 132. It should be understood that the molten material injector device 300 of the system of FIG. 1 may be utilized with a reservoir 161 (as is depicted in FIG. 10 and subsequently described herein) or with a pump such as in the embodiment of FIG. 1.

Figure 2:
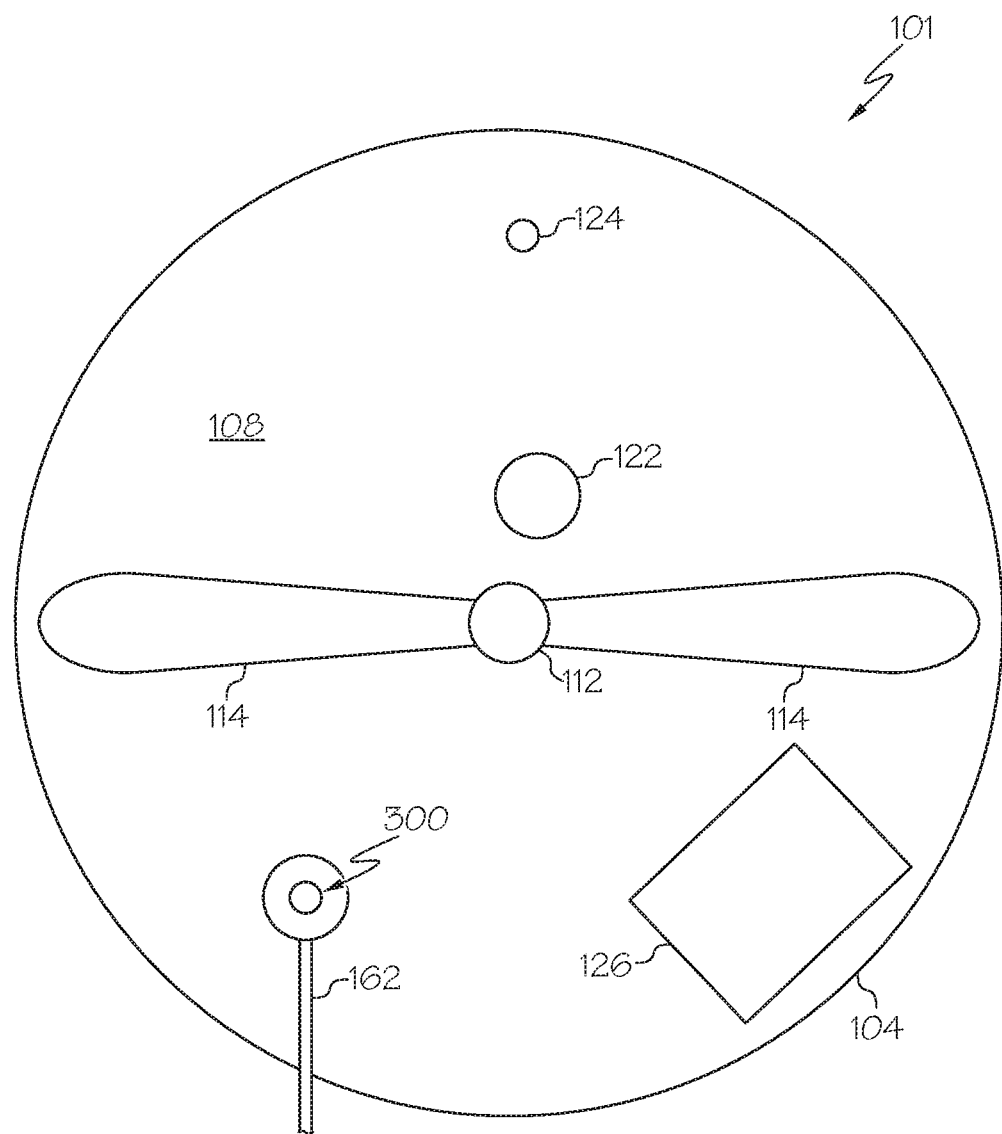
FIG. 2 schematically depicts a top view of the system of FIG. 1, according to one or more embodiments described herein.

According to one or more embodiments, the reactor 101 may include a bottom bowl 103, a top cover 106, and sidewalls 104 defining a reaction zone 108. As depicted in the embodiments of FIGS. 1 and 2, the reactor 101 may be cylindrically shaped, although other shapes are contemplated such as, for example, a dome shape. The reactor 101 may additionally include a gas inlet 122 and a water inlet 124. An oxidizing gas such as air, may enter the reactor 101 via the gas inlet 122, an inert gas such as nitrogen, may enter the reactor 101 via the gas inlet 122. The product material (i.e., solid metal-containing particles) may exit the reactor 101 through a solid metal-containing material outlet 126. The metal-containing material outlet may comprise, for example a duct, chute, or other passage. The gas may pass into the reaction zone 108 via gas inlet 122 and may pass out of the reaction zone 108 (along with the solid particle products) via solid metal-containing material outlet 126. The gas exiting through the solid metal-containing material outlet 126 gas may at least partially aid in transporting the solid particles out of the reactor 101. The reactor 101 may additionally include a water inlet 124. Water may be injected into the reaction zone 108 to control the temperature in the reaction zone 108. It should be understood that while FIGS. 1 and 2 depict one embodiment of a reactor suitable for the presently described processes, other reactor configurations are contemplated, such as reactor configurations with varying geometric shapes and positions for the one or more inlets and outlets of the reactor. For example, the molten material injector device 300 may be positioned on a sidewall 104 of the reactor 101.

The reactor 101 includes a reaction zone 108 where a reaction or physical change to the molten material takes place. As described herein, the "reaction" may include any chemical or physical change of the injected molten metal-containing material. For example, the molten metal-containing material may be oxidized in the reaction zone 108. However, in other embodiments, the molten metal-containing material may not undergo a chemical reaction, and may instead be converted to solid particles of a similar or smaller size than the molten metal-containing material entering the reactor 101. For example, an oxidation reaction may take place when an oxidizing gas, such air, is injected into the reactor 101. However, nitrogen or other non-reactive gasses may be utilized when oxidation is not desired. It should further be appreciated that the use of an oxidizing gas may yield both oxidized and metallic product in a mixture. It is contemplated that in any embodiment described herein which generates a metal oxide by exposure to oxygen, air, pure oxygen, or any combination or mixture thereof may be utilized. For example, molar ratios of air to oxygen of about 10:0, 7.5:2.5, 5:5, 2.5:7.5 and 0:10 are contemplated.

The reactor 101 may include, in some embodiments, an agitator 114, such as a blade The blade may rotate to mix and agitate molten metal-containing materials passed into the reactor 101. The agitator 114 may be driven by the rotation of a rotor 112, where one or more appendages spin to agitate the molten material in the reactor 101.

FIG. 1 depicts a Barton reactor (sometimes referred to as a Barton pot), such as disclosed in U.S. Pat. No. 633,533. In one or more embodiments presently disclosed, a Barton reactor may be modified by the addition of a molten material injector device 300. In a conventional process utilizing a Barton reactor, a large heated pot may be fed with a stream of molten lead (non-atomized) which is maintained at a shallow depth in the bottom of the pot. A rapidly rotating blade in the bottom of the pot may continuously agitate the molten lead, which is oxidized in the presence of a stream of air and water or steam. A portion of the oxidized lead particles and/or atomized lead droplets may be drawn from the pot by the air stream while the heavier lead droplets fall by gravity to the bottom of the pot for further agitation and oxidation. The process may be controlled by adjusting the rate of feed of the molten lead, the air flow through the pot, and/or the speed of the blade. In one or more embodiments, a Barton process may operate at relatively high temperatures, substantially above the melting point of lead which is 327° C. (621° F.) when oxidized lead is desired.

Conventional Barton reactors and processes (without the modifications described herein) may have several inherent disadvantages to the processes described herein utilizing an atomized or laminar flow introduction of molten metal. For example, when used for producing high free lead litharge for battery manufacturing, the lead oxides produced are often too coarse for use in the formulation of battery active material paste and must, therefore, be subjected to hammer mill processing subsequent to their initial production in a Barton pot. In addition, the conventional Barton process may be difficult to control when used to produce low free lead litharge and may not be capable of consistently producing lead oxide with a free lead content of less than 1 wt. % (or even with a free lead content of less than 2 wt. %, 3 wt. %, 4 wt. %, 5 wt. %, 10 wt. %, 15 wt. %, 20 wt. %, 25 wt. %, 30 wt. %, 35 wt. % or even 40 wt. %). Additionally, the operation of a conventional Barton pot may result in a build-up of lead on the blade and walls, requiring periodic shut down and manual cleaning of the component surfaces.

According to some of the embodiments presently disclosed, a Barton or Barton-type reactor is not utilized for the formation of the particles. As would be appreciated by one skilled in the art, Barton reactors may be utilized to form lead oxides. However, it has been discovered, as is described herein, that other reactor configurations may be utilized to form metal-containing particles. In one or more embodiments, these presently described reactors may form particles through contact with an injected stream of molten metal with a process gas in a reactor prior to the molten metal contacting the bottom of the reactor.

Figure 3:
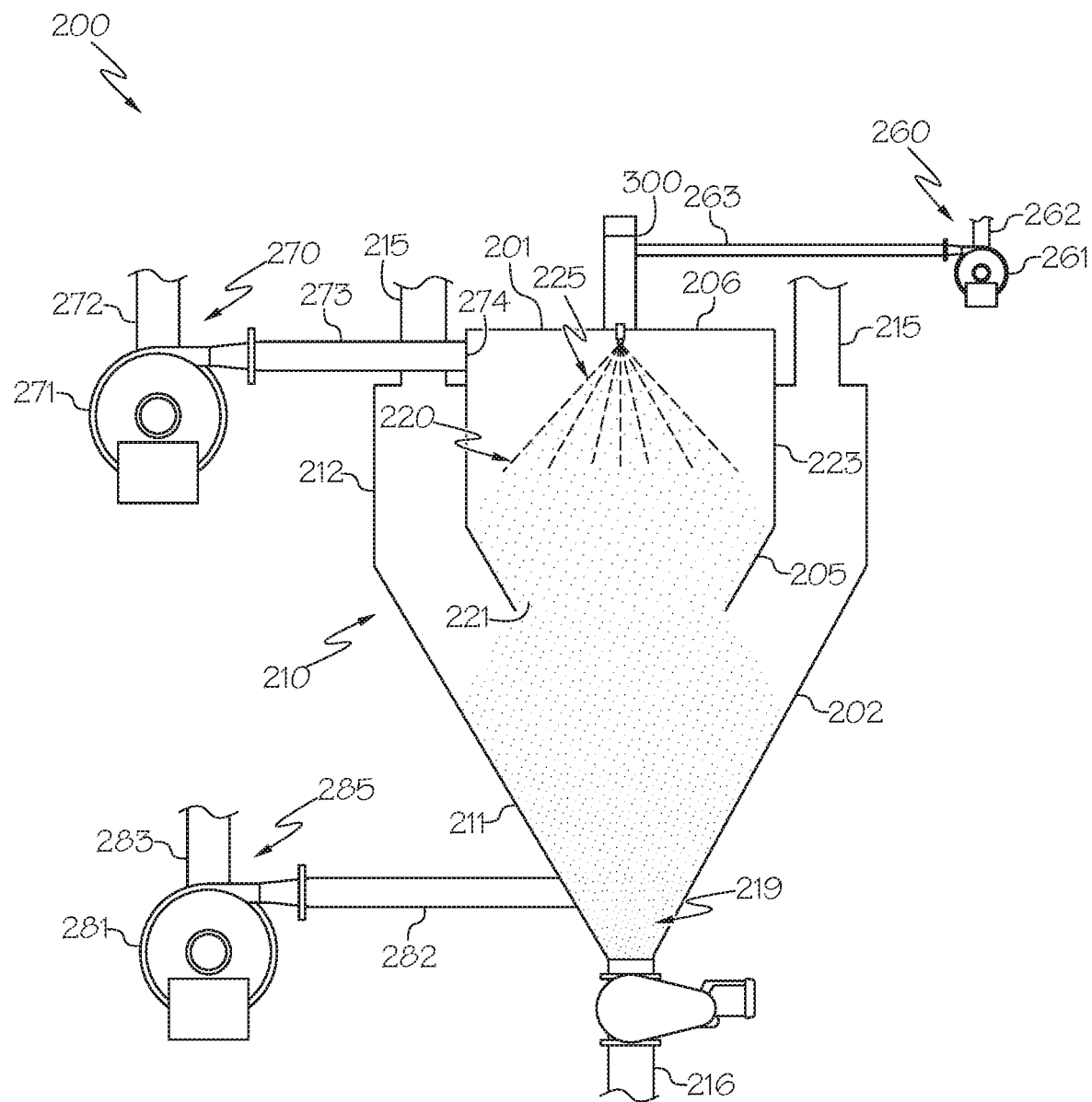
FIG. 3 schematically depicts a perspective side view of another system used for forming metal-containing particles, according to one or more embodiments described herein.

Referring now to FIG. 3, a side perspective view of a reactor system 200 utilized to form metal-containing particles is depicted. According to one or more embodiments, the reactor system 200 may include a reactor 201 defining a reaction zone 220. The reactor system 200 may include a separation zone 202 generally downstream of the reactor 201. A molten material may be supplied to the reactor 201 via a molten metal material supply system 260, and subsequently through a molten material injector device 300. A gas may be supplied to the reactor 201 by a gas supply system 270. The molten material injector device 300 may generally positioned on an upper portion of the reaction zone 202 and pass the molten material downwardly. The process gas may enter the reaction zone through one or more inlets that are tangential to the perimeter of the reaction zone, allowing for the process gas to swirl around the perimeter of the reaction zone tangential to the sidewalls. For example, a cyclonic processing gas pattern may be formed around the perimeter of the reaction zone. The injector 300 may be positioned near the center of the upper portion of the reaction zone 202 such that the process gas swirls around the perimeter of the reaction zone 202 and contacts the molten material as it passes through the reaction zone 202.

According to one or more embodiments, as is described herein, the molten metal is injected into the reactor 201 and is contacted by a process gas, which forms a solid, metal-containing particle. The solid particles are collected in the separation zone 202 where the various reaction gases are separated from the particles. The reactor zone may operate at temperatures of at least 621° F., such as temperatures contemplated in other reactor embodiments and described herein. The separation zone may have a lower temperature, such as below the melting point of material of the formed particles, such as 621° F. for lead.

According to one or more embodiments, the molten metal material supply system 260 may include a molten metal material source 262, a molten metal material pump 265, and a molten metal material supply line 263. The molten metal material supply line 263 may be in fluid communication with the molten material injector device 300. The molten metal material source 262 may be in fluid communication with a source of molten metal, such as a kettle. In other embodiments, the molten metal material may be supplied to the molten material injector device 300 at an appropriate and consistent pressure using other means such as a gravity pressurized reservoir. The molten material injector device 300, which is explained in detail below, injects the molten metal into the reactor 201.

The molten metal material source 262 may comprise piping which is fluidly connected to a melt kettle (not depicted in FIG. 3) or other apparatus which may melt solid metal-containing supply materials. For example, the melt kettle may melt solid metallic lead into molten lead. In additional embodiments, the molten material may be conveyed by gravity alone, or at least in part. According to one or more embodiments, metal, such as lead, may be melted in the melt kettle to a temperature at or exceeding the metal's melting point, such as 621° F. for lead, and less than that of the metals boiling point, such as 3,180° F. for lead. Without limitation, in one embodiment, the molten material may be pumped from the melt kettle through a pipe into the reservoir (not shown) or directly to the molten material injector device 300.

The reactor 201 may define a reaction zone 220, and may include an upper section 223 having a circular cross section, such as a cylindrical shape, with a defined height and diameter, and a lower frustum section 205 with a defined height and lower opening diameter. Gas may be supplied to the upper cylindrical section 223 using a gas supply system 270. According to some embodiments, the gas supply system 270 may include a blower 271, a gas inlet 272, and a gas injection line 273. According to some embodiments, the gas supply system 270 may be configured to supply an oxidizing gas, such as air, for the production of metal oxide particles. According to other embodiments, the gas supply system may provide inert gas such as nitrogen, for the production of solid metal particles. Other components not depicted may be used to provide a suitable ratio of oxidizing to inert gas in the gas supply system 270, these components may be pressure swing absorbers, electrolyzers, cryogenic nitrogen tanks, cryogenic oxygen tanks, compressed nitrogen tanks, compressed oxygen tanks, chillers, compressors, or any other related air handling equipment. According to some embodiments, the gas supply system 270 may supply gas at an ambient environmental temperature, such as about 25° C. (e.g., 20-35° C.). In additional embodiments, the gas supply may be heated, such as to a temperature of from 25° C. to 5000° C., such as from 25° C. to 50° C., 50° C. to 75° C., 75° C. to 100° C., 100° C. to 125° C., 125° C. to 150° C., 150° C. to 200° C., 200° C. to 250° C., 250° C. to 300° C., 300° C. to 350° C., 350° C. to 400° C., 400° C. to 450° C., 450° C. to 500° C., 500° C. to 550° C., 550° C. to 600° C., 600° C. to 650° C., 650° C. to 700° C., 700° C. to 750° C., 750° C. to 800° C., 800° C. to 850° C., 850° C. to 900° C., 900° C. to 950° C., 950° C. to 1000° C., 1000° C. to 1100° C., 1100° C. to 1200° C., 1200° C. to 1300° C., 1300° C. to 1400° C., 1400° C. to 1500° C., 1500° C. to 1600° C., 1600° C. to 1700° C., 1700° C. to 1800° C., 1800° C. to 1900° C., 1900° C. to 2000° C., 2000° C. to 2250° C., 2250° C. to 2500° C., 2500° C. to 2750° C., 2750° C. to 3000° C., 3000° C. to 3275° C., 3275° C. to 3500° C., 3500° C. to 3750° C., 3750° C. to 4000° C., 4000° C. to 4275° C., 4275° C. to 4500° C., 4500° C. to 4750° C., 4750° C. to 5000° C., or any combination thereof. Other components not depicted may be used to provide process heat to the gas supply system 270, these components may include resistive heaters, heat exchangers, natural gas heaters, boilers, direct combustion heaters, arc heaters, induction heaters, microwave heaters, or any other related process heat systems.

The reaction zone 220 may generally be where the reaction or physical change to the molten material takes place. As described herein, the "reaction" may include any chemical or physical change of the injected molten metal-containing material. For example, the molten metal-containing material may be oxidized in the reaction zone 220. However, in other embodiments, the molten metal-containing material may not undergo a chemical reaction, and may instead be converted to solid particles of a similar or smaller size than the molten metal-containing material entering the reaction zone 220. For example, an oxidation reaction may take place when an oxidizing gas, such air, is injected into the reaction zone 220. However, nitrogen or other non-reactive gasses may be utilized when oxidation is not desired.

The process may operate at relatively high temperatures, substantially above the melting point of lead which is (621° F.) when oxidized lead is desired or substantially below the melting point of lead which is 327° C. (620° F.) when powdered lead metal is desired.

Downstream of the reaction vessel may be a separation zone 202. The separation zone 202 may include a one or more exhaust ports 215 and one or more solid particle exits, such as the depicted solid particle removal pathway 216.

The separation zone may include an upper exhaust region 212 and a lower frustum 211. The metal containing particles 219 may accumulate in the separation zone 202 and be directed to the solid particle removal pathway 216. The solid particle removal pathway 216 may comprise a one or more of bins, hoppers, chutes, feeders, pneumatic conveyors, belt conveyors, hydraulic conveyors, or any other solid particle transfer equipment. Between the reaction zone 220 and/or the separation zone 202, it may be necessary to cool the metal containing particles 219. According to some embodiments, a cooling gas or liquid may introduced to the falling metal containing particles using a cooling air supply 285. The cooling air supply may include a blower 281, an air intake 283, and an air injector 282.

The metal-containing material outlet may comprise, for example a duct, chute, or other passage. The gas may pass into the reaction zone 220 via reaction gas injector 274 and may pass out of the reaction zone (along with the solid particle products) via an opening at the bottom of the reaction zone 220. The gas exiting through the bottom of the reaction zone frustum may at least partially aid in transporting the solid particles out of the reaction zone 220.

The reactor system 200 may additionally include a water inlet (not shown). Water may be injected into the reaction zone 220 to control the temperature in the reaction zone.

Figure 4:
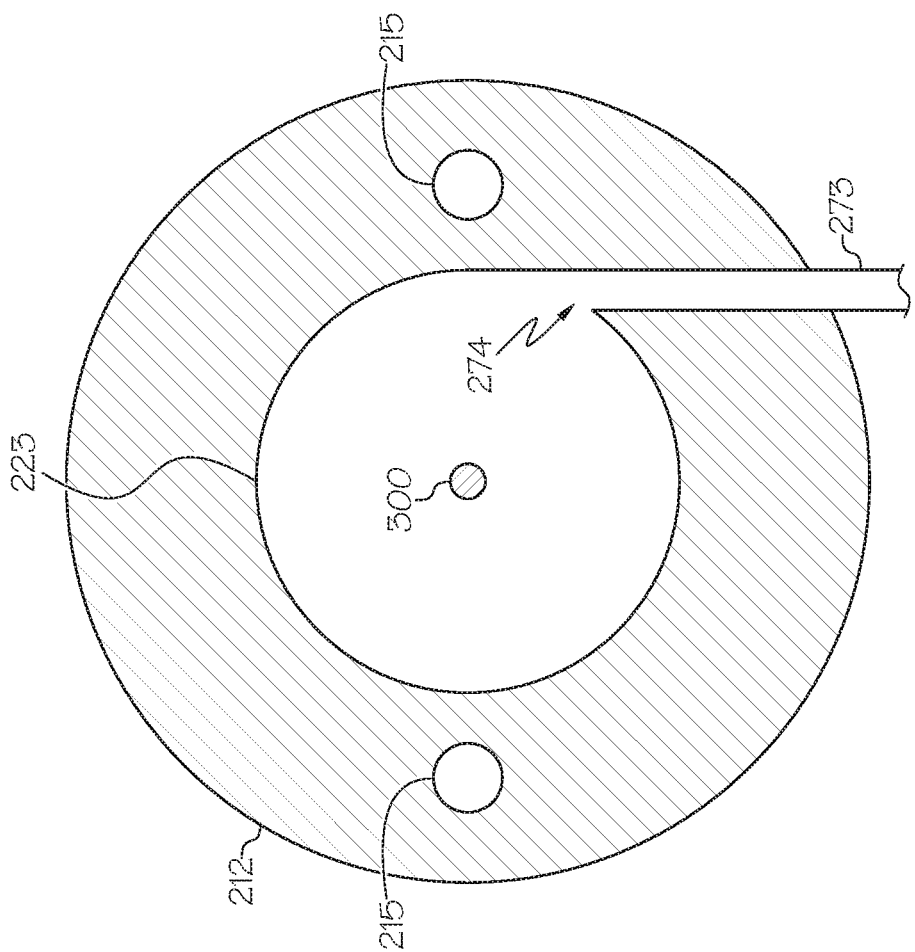
FIG. 4 schematically depicts a perspective top down view of the system for forming metal-containing particles of FIG. 3, according to one or more embodiments described herein.

FIG. 4 is a top down perspective view of the reactor system 200, showing the upper cylindrical section 223 positioned within the upper exhaust region 212. The housing also contains the one or more exhaust ports 215. According to some embodiments the gas outlets may be round, according to other embodiments they may be square, constitute an annulus surrounding the upper cylindrical section 223, or be any other shape found desirable. According to some embodiments the reaction gas injector 274 may tangential to the upper cylindrical section 223, such as to cause the molten material and gas to swirl within the reactor, creating turbulent conditions.

It should be understood that while FIGS. 3 and 4 depict one embodiment of a reactor suitable for the presently described processes, other reactor configurations are contemplated, such as reactor configurations with varying geometric shapes and positions for the one or more inlets and outlets of the reactor. For example, the molten material injector device 300 may be positioned on the upper cylindrical section 223 of the reactor system 200.

Figure 6:
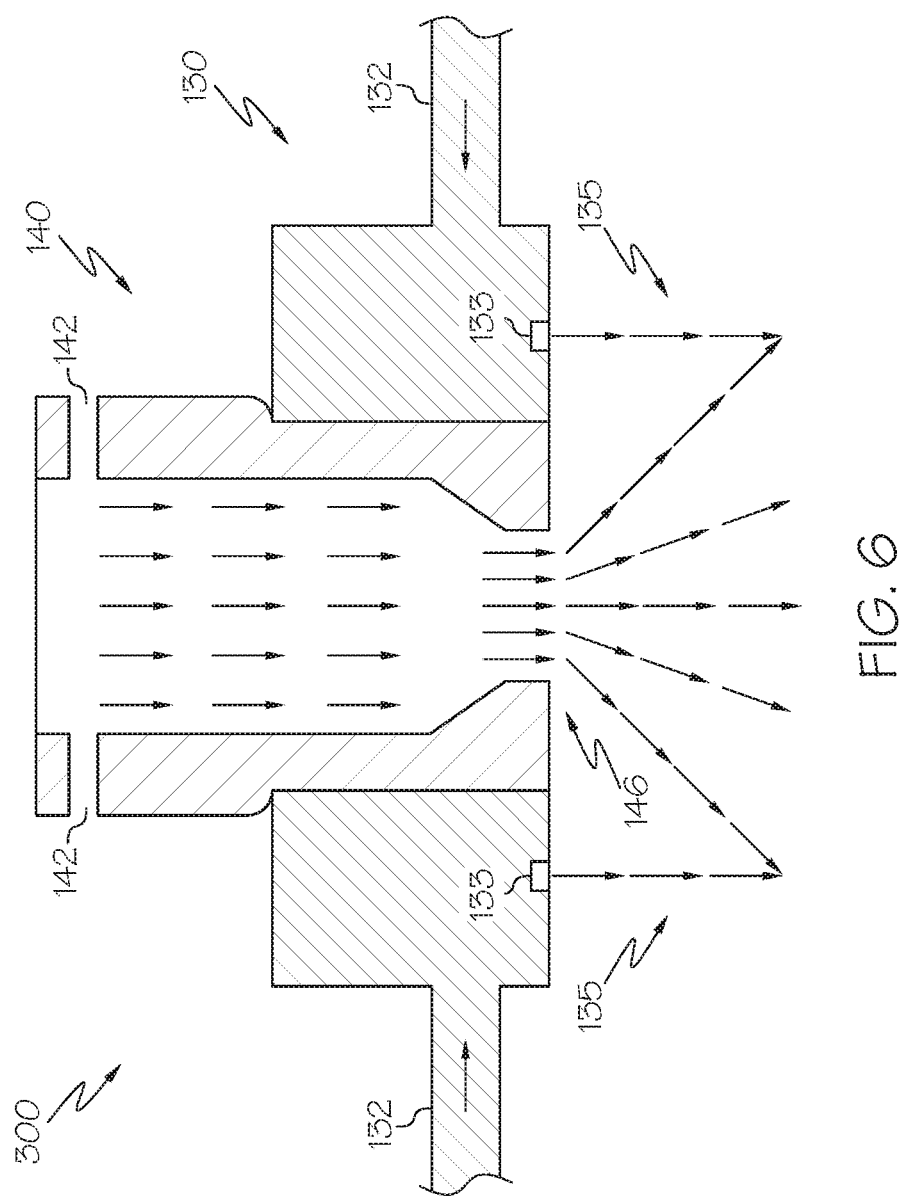
FIG. 6 schematically depicts a side view of a molten material injector, according to one or more embodiments described herein.
Figure 7A:
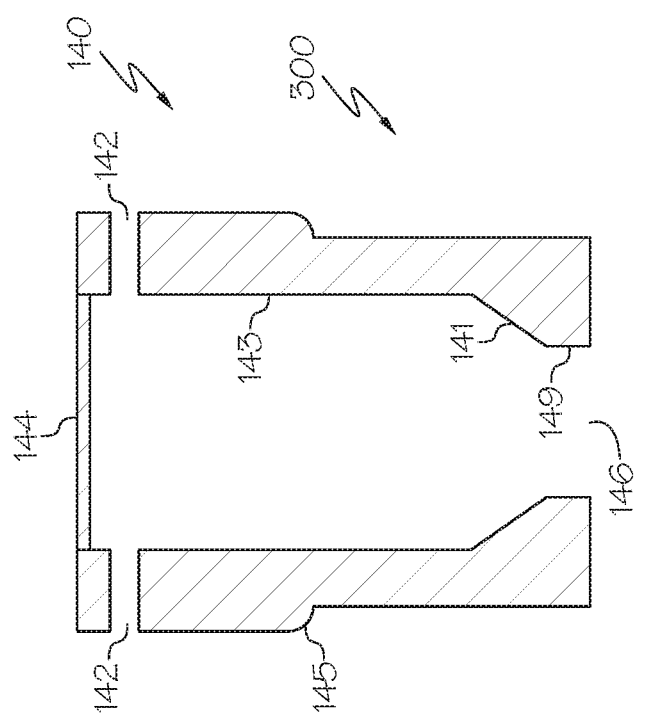
FIG. 7A schematically depicts a cross-sectional side view of a single-conduit injector, according to one or more embodiments described herein.

It should be appreciated that a wide variety of injector devices 300 may be utilized in the disclosed systems and methods, these injector devices varying in size, interior shape, etc. According to one or more embodiments, the molten material injector device 300 may comprise a single-conduit injector 140. For example, embodiments of single-conduit injectors are depicted in FIGS. 6, 7A and 7B. As described herein, the single-conduit injector 140 may function as an atomizer, or at least inject molten metal-containing material with a laminar flow. In additional embodiments, such as that depicted in FIG. 6, the single-conduit injector 140 may include a gas annulus 135 which may function to impinge the flow of the molten metal.

Figure 5:
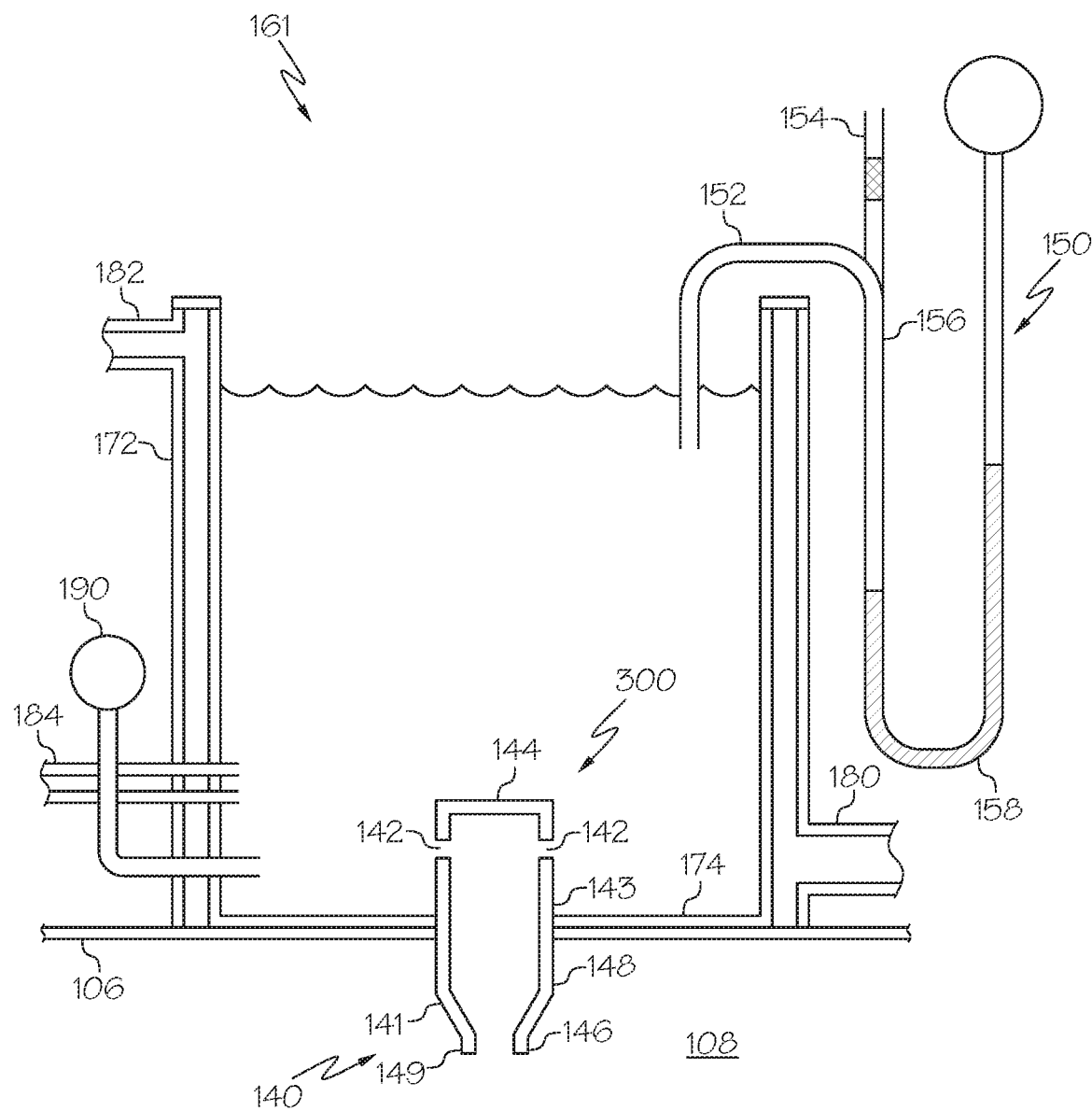
FIG. 5 schematically depicts a side view of a molten material reservoir and injector, according to one or more embodiments described herein.

Referring now to FIG. 5, a cross-sectional view of an embodiment of a molten material injector device 300 is depicted. The molten material injector device 300 may be comprised of two or more components including a single-conduit injector 140, depicted in greater detail in at least FIGS. 6, 7A and 7B, and a gas manifold 130, depicted in greater detail in FIGS. 6 and 9. It should be understood that the single-conduit injector 140, under certain conditions, may be capable of sufficiently atomizing the molten metal-containing material without the gas manifold 130.

According to one or more embodiments disclosed herein, the molten material injector device 300 may comprise a single-conduit injector 140, such as depicted in FIG. 5. The single-conduit injector 140 may comprise a cylindrical conduit tube 143 with defined length and inside diameter, with multiple or single inlets 142 located at the molten material feed end 144, and a nozzle 148, with defined geometry and ejection opening located at the outlet end 146. Molten materials at variable pressures may be introduced into the feed end 144 of single-conduit injector 140 and may exit the outlet end 146 in the physical form of a laminar sheet or atomized droplets. A single-conduit injector may improve control of molten material atomization, resulting in some embodiments in improved control of the product particle size distribution, improved control of residual free lead, and/or increased lead oxide production rates (in processes where lead is oxidized).

As described herein, the molten material injector device 300 may function as an atomizer, or at least inject molten metal-containing material with a laminar flow. In additional embodiments, such as that depicted in FIG. 4, the molten material injector device 300 may include a gas annulus 135 which may function to impinge the flow of the molten metal.

Various physical parameters characteristic to molten materials (e.g., molten lead) such as, but not limited to, density viscosity and surface tension may affect the fluid properties of the molten feed stream exiting the single-conduit injector 140. Various design parameters, such as, but not limited to injector inlet geometry, injector inlet area, injector inlet perpendicular to tangential orientation, injector inside cylindrical length, injector inside cylindrical diameter, nozzle converging section design, nozzle throat diameter, and inside surface finish may affect the interaction between the molten feed stream and the Single-Conduit Injector, wherein the control of each of these characteristics are contemplated herein.

While the reactor systems 100, 200 of FIGS. 1 and 3 depict a single molten material injector device 300 positioned at the cover top 106, 206 of the reactor 101, 201, it is contemplated that more than one molten material injector devices 300 may be utilized on a single reactor 101, 201 which may be positioned at other areas of the reactor 101, 201. For example, molten material injector devices 300 may be positioned on other portions of the top cover 106, 206 or on the sidewalls 104, 204 of the reactor 101, 201.

As depicted in FIG. 6, in some embodiments the single-conduit injector 140 may be positioned to release molten metal-containing material within a gas annulus 135 discharged through gas manifold 130. The gas annulus 135 may be supplied by a gas manifold 130 and through a gas discharge 133. The gas manifold 130 may be in direct contact with the exterior of the single-conduit injector 140. Each of the single-conduit injector 140 and the gas manifold 130 may each be assembled from more than one body. For example, in one embodiment, the single-conduit injector device may have a lower nozzle piece and an upper cap piece, the two pieces threading into one another. Other methods of connecting the two pieces are contemplated as well including press fit, adhesives, epoxies, welding, brazing, bolts, external clamps or fittings, and the like.

As depicted in FIG. 6, in one or more embodiments, the molten metal-containing material may be dispensed in a hollow conical pattern, which may be contacted by the gas annulus flowing down at a different angle, such as normal with respect to the top cover 106, 206 of the reactor 101, 201. According to additional embodiments, the molten metal-containing material may be atomized by the single-conduit injector 140, such as when the single-conduit injector 140 acts as a sprayer. Without being bound by theory, it is believed that when a stream of high viscosity molten metal-containing material, such as lead, flows through an single-conduit injector 140 at relatively high mass flow rates, the difference in velocity between the stream of molten metal-containing material and surrounding air, or an inert gas, promote droplet atomization. The atomized droplets may then be introduced into, for example, the reaction zone 120, 220 of the reactors of FIG. 1 or 3, which may enhance chemical reaction rates and manufacturing output.

According to one or more embodiments, the single-conduit injector 140 may produce a laminar flow of molten metal-containing material entering the reactor 101, 201 and subsequently the laminar flow may be impinged upon with a high velocity gas annulus 135, as depicted in FIG. 6. Without being bound by theory, it is believed that when streams of high viscosity molten metal-containing materials, such as lead, flow through an injector, such as the single-conduit injector 140, at relatively low mass flow rates and are impinged with high velocity gas, atomized molten droplets may form. The high velocity gas flow may enhance molten lead atomization as the laminar flow of molten lead comes in contact with gas annulus high velocity gas, along with the turbulent gas environment of the reactor 101, 201.

According to one or more additional embodiments disclosed herein, the molten material injector device 300 may comprise air sprayers, inert gas sprayers, oxidizing gas sprayers, pressure sprayers, electrostatic sprayers, or ultrasonic sprayers. The selection of an appropriate molten material injector device may affect various properties of the output product material. For example, and without limitation, the injection of the molten metal-containing material may be selected to influence one or more of particle size distribution (lead oxide or free lead), particle shape, lead oxide surface area, lead oxide acid absorption, and/or manufacturing rate. A desired molten material injector device may also be determined by process specification such as head pressure, etc.

Referring now to FIG. 5, a cross-sectional view of an embodiment of a molten material injector device 300 is depicted. The molten material injector device may be comprised of two or more components including a molten material injector device 300, depicted in greater detail in FIG. 6, and a gas manifold 130, depicted in greater detail in FIG. 7A. It should be understood that the molten material injector device 300, under certain conditions, may be capable of sufficiently atomizing the molten metal-containing material without the gas manifold 130. As depicted in FIG. 6, in some embodiments the molten material injector device 300 may be positioned to release molten metal-containing material within a gas annulus 135 discharged through gas manifold 130. The gas annulus 135 may be supplied by a gas manifold 130 and through a gas discharge 133. The gas manifold 130 may be in direct contact with the exterior of the molten material injector device 300. Both the molten material injector device 300 and the gas manifold 130 may each be assembled from more than one body. For example, in one embodiment, the single-conduit injector device may have a lower nozzle piece and an upper cap piece, the two pieces threading into one another. Other methods of connecting the two pieces are contemplated as well including press fit, adhesives, epoxies, welding, brazing, bolts, external clamps or fittings, and the like.

Now referring to FIG. 7A, a single-conduit injector 140 is depicted. The single-conduit injector 140 may comprise an outer surface 145; a cylindrical conduit tube 143 with defined length and inside diameter; multiple or single inlets 142 located at the molten material feed end 144; a converging section 141 with defined length; and a nozzle 149 with defined length, geometry, and orifice area located at the outlet end 146. In some embodiments, such as that as depicted in FIG. 8 the multiple or single inlets 142 may be positioned tangentially to the circumference of the cylindrical conduit tube 143, and normal to the height of the conduit tube. The top 144 of the single-conduit injector 140 may be circular and cap the device.

According the some embodiments, the angle between converging section 141 and the cylindrical conduit tube 143 may be from 90° to 180°, such as from 90° to 115°, from 115° to 130°, from 130° to 145°, from 145° to 160°, from 160° to 175°, from 175° to 180°, or any combination thereof.

It should be appreciated that one or more embodiments of the disclosed single-conduit injector 140 may not include a converging section 141 (e.g., the cylindrical conduit tube 143 has a diameter about the same as the nozzle 149. This can be considered analogous to the angle between the converging section 141 and the cylindrical conduit tube 143 equal to about 180° (i.e., on the same plane).

As depicted in FIG. 6, molten metal-containing material may enter the single-conduit injector at the one or more inlets 142, travel through the converging section 141 towards the nozzle 149. As the molten metal-containing material travels across the converging section the available cross sectional area decreases and the speed of the material increases. The parameters which control the eventual mass and velocity of the molten metal-containing material as it exits the outlet end 146 are the inlet pressure, inlet 142 diameter and position, the cylindrical conduit tube 143 length and diameter, the converging section 141 length and angle, and the nozzle 149 length and diameter. In some embodiments the configuration of the single-conduit injector will cause the molten metal-containing material to spray out in a hollow cone, in other embodiments the molten metal-containing material may spray out in other patterns such as a swirl or a stream.

As depicted in FIG. 8, in one or more embodiments, as the molten metal-containing material enters the single-conduit injector 140 through the one or more inlets 142, it swirls within the cylindrical conduit tube 143. This further affects the flow profile of the molten metal-containing material as it exits through the nozzle 149.

As depicted in FIG. 6, the single-conduit injector 140 may be positioned in the center of a gas annulus 135 with defined diameter and gap width. Molten metal-containing materials at variable pressures may be introduced into the feed end 144 of single-conduit injector 140 and may exit the outlet end 146 in the physical form of a laminar sheet or atomized droplets. A high velocity flow of gas 135 (in an annulus) impinges upon the laminar flow of molten lead such that atomization of molten metal-containing material is enhanced, resulting in some embodiments in improved control of the product particle size distribution, improved control of residual free lead, and/or increased lead oxide production rates (in processes where lead is oxidized.

Figure 9:
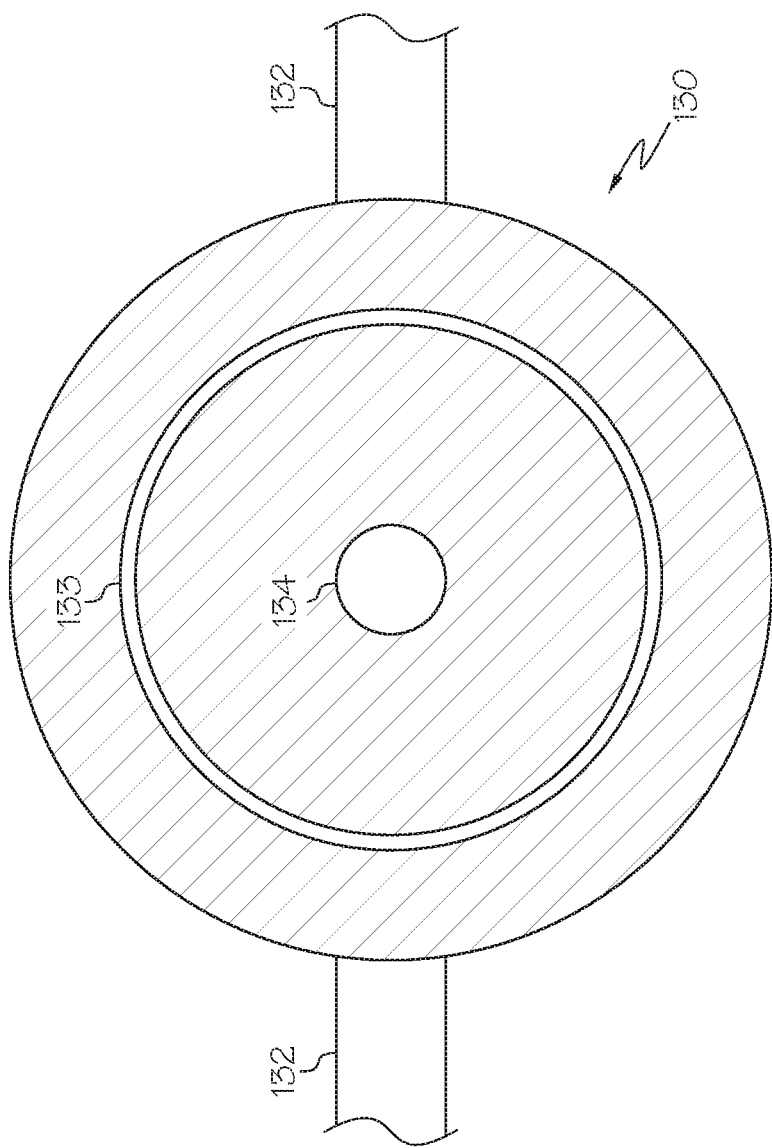
FIG. 9 schematically depicts a bottom-up view of the gas manifold shown in FIG. 6, according to one or more embodiments described herein.

Referring now to FIG. 9, a bottom up view of a gas manifold 130 is depicted. In some embodiments, one or more gas supplies 132 enter from the side of a spherical manifold. According to other embodiments the exterior of the manifold may be square, rectangular, octagonal, or any other geometric shape. In embodiments which utilize the gas manifold, the single-conduit injector 140 passes molten metal-containing material through a molten metal material injector opening 134. The single-conduit injector may be disposed within a molten metal material injector opening 134 or it may be disposed above the opening and release molten metal-containing material through the opening. In some embodiments, gas enters through the one or more gas supplies 132 and exits through the gas discharge 133, preferably, substantially all of the gas exits perpendicular to the diameter of the cylindrical conduit tube 143. This gas exiting the gas discharge 133 forms the gas annulus 135 in embodiments which utilize a gas annulus. A molten metal material injector opening 134 may comprise an inner diameter and an outer diameter. The inner diameter of the gas discharge may be from 3 to 10 in, or from 5 to 9 in, or from 6 to 8 in. The outer diameter of the gas discharge may be from 0.0001 in to 2 in, or from 0.0005 in to 1 in, or from 0.001 in to 0.1 in, or from 0.001 in to 0.01 in, larger than the inner diameter of the gas discharge.

According to one or more embodiments, the molten material injector device 300 may atomize the molten metal-containing material to a $d_{50}$ size of from 1 to 5 microns, from 5 microns to 10 microns, from 10 microns to 25 microns, from 25 microns to 50 microns, from 50 microns to 100 microns, from 100 microns to 150 microns, from 150 microns to 200 microns, from 200 microns to 250 microns, from 250 microns to 300 microns, or any combination thereof. The atomized introduction of molten metal to the reactor 101 may result in solid product particles having a $d_{50}$ of from 0.5 microns to 300 microns (such as from 0.5 microns to 5 microns, from 5 microns to 10 microns, from 10 microns to 25 microns, from 25 microns to 50 microns, from 50 microns to 100 microns, from 100 microns to 200 microns, from 200 microns to 300 microns, or any combination thereof. The product particles may have a relatively uniform size.

According to one or more embodiments, the molten material injector device 300 may produce a laminar flow of molten metal-containing material entering the reactor 101, 201. Without being bound by theory, it is believed that when streams of high viscosity molten metal-containing materials, such as lead, flow through an molten material injector device 300 at relatively low mass flow rates, absent of any external gas turbulence, molten droplets may form and align in parallel streams resulting in a laminar flow. The laminar flow may be a parabolic stream in appearance and may enhance molten lead atomization as the laminar flow enters the turbulent environment of the reactor 101, 201.

According to one or more embodiments, the velocity, temperature, viscosity, density, and/or surface tension of the molten metal-containing material feed stream may influence the atomization properties, such as droplet size. In some embodiments, the molten stream velocity entering the reactor 101, 201 may be increased by controlling the molten metal-containing material stream head pressure, such that the mass flow rate exceeds the mass flow rate feed typical of a standard Barton Reactor. The relatively high pressure may also result in reduced molten particle size (i.e., increased atomization).

In one or more embodiments, the reactor system 100, 200 fitted with a molten material injector device 300 may be capable atomizing a molten stream of lead into solid particles that are significantly smaller than droplet sizes achieved by a traditional Barton Reactor (i.e., one in which molten metal-containing material enters in a non-atomized form). Therefore, the presently described reactor systems may be capable of higher production rates when compared to conventional Barton technology.

While the reactor systems 100, 200 of FIGS. 1 and 3 depict a single molten material injector device 300 positioned at the cover top 106, 206 of reactor 101, 201 it is contemplated that more than one molten material injector devices 300 may be utilized on a reactor 101, 201, which may be positioned at other areas of the reactor 101, 201. For example, molten material injector devices 300 may be positioned on other portions of the vessel top 106, 206 or on the sidewalls 104, 204 of the reactor 101, 201.

Various physical parameters characteristic to molten metal-containing materials (e.g., molten lead) such as, but not limited to, density viscosity and surface tension may affect the fluid properties of the molten feed stream exiting the single-conduit injector 140. Various design parameters, such as, but not limited to injector inlet geometry, injector inlet area, injector inlet perpendicular to tangential orientation, injector inside cylindrical length, injector inside cylindrical diameter, nozzle converging section design, nozzle throat diameter, and inside surface finish may affect the interaction between the molten feed stream and the Single-Conduit Injector, wherein the control of each of these characteristics are contemplated herein.

In additional embodiments, various operating parameters relative to the molten metal-containing material (such as metallic lead) such as, but not limited to, temperature, mass flow rate, head pressure, and/or superficial velocity, may affect the interaction between the molten feed stream and the single-conduit injector 140, such that the molten lead exiting the nozzle 149 of the single-conduit injector 140 efficiently and/or controllably forms a laminar sheet, a stream of atomized droplets, or a uniform diameter flow.

According to one or more embodiments, the temperature of a molten metal-containing material feed stream entering the single-conduit injector 140 may be controlled to attain a desired molten metal-containing material density, viscosity, and/or lead surface tension, such that the desired atomization and droplet size are achieved. For example, molten lead may be at a temperature greater than lead's melting point, 327.5° C., and less than lead's boiling point, 1,740° C., such that the molten lead density is conducive to achieve the desired laminar flow, atomization and/or droplet size.

According to one or more embodiments, the superficial velocity, head pressure, of a molten metal-containing material feed stream within the single-conduit injector 140 may be controlled to attain a desired laminar flow or atomized droplet size. For example, the laminar velocity may be from 1 m/s to 100 m/s. The head pressure may be from 1 psi to 250 psi. In one or more embodiments, superficial velocity, mass flow rate, head pressure, and/or the free material's reactivity with oxygen may be functions of the temperature of the molten metal-containing material feed stream entering and exiting the single-conduit injector 140. For example, if lead is processed, the temperature of the molten lead may be from 327.5° C. to 1740° C. According to one or more embodiments, the mass flow rate of the molten lead into the reactor 101, 201 may determine the process production rate of product solid particles. In one or more embodiments, mass flow rates are attainable from 500 lb/hr to 20,000 lb/hr.

Referring again to FIG. 7A, according to some embodiments, the inlet 142 diameter could be from 0.01 in to 1 in, or from 0.03 in to 0.16 in, or from 0.03 in to 0.125 in, or from 0.089 in to 0.125 in. The discharge 146 diameter could be from 0.1 in to 1 in, or from 0.25 in to 1.6 in, or from 0.35 in to 0.55 in. The outlet end 146 length could be from 0.1 in to 2 in, or from 0.1 in to 1 in or from 0.25 in to 0.5 in. The length of the converging section could be 0 in, or from 0.1 in to 1 in, or from 0.25 in to 1 in, or from 0.25 in to 0.5 in. The conduit tube 143 diameter could be from 0.1 in to 8 in, or from 0.2 in to 6 in, or from 0.25 in to 2 in, or from 0.5 in to 1.5 in. The cylindrical conduit tube 143 length could be from 0.1 in to 8 in, or from 0.25 in to 6 in, or from 0.5 in to 4 in, or from 2 in to 4 in. The single-conduit injector 140 may be constructed of metal and may be polished to a 300 grit finish in its interior.

Referring now to FIG. 7B, according to some embodiments, the inlet 142 diameter may be substantially aligned with the cylindrical conduit tube 143. The converging section 141 may be substantially perpendicular to the cylindrical conduit tube 143. Single-conduit injector 140 may be configured with a variety of attachment mechanisms including threads, glue, welding, epoxy, brazing, or press fittings. According to one embodiment, outer surface 145 includes threads. Inlet 142 diameter may be from 0.1 in to 1 in, such as, from 0.1 in to 0.2 in, or from 0.2 in to 0.3 in, or 0.3 in to 0.4 in, or from 0.4 in to 0.5 in, or from 0.5 in to 0.6 in, or from 0.6 in to 0.7 in, or from 0.7 in to 0.8 in, or from 0.8 in to 0.9 in, or from 0.9 in to 1 in, or any combination thereof. The discharge 146 diameter may be from 0.05 in to 0.3 in, such as from 0.05 in to 0.06 in, or from 0.06 in to 0.07 in, or from 0.07 in to 0.08 in, or from 0.08 in to 0.09 in, or from 0.09 in to 0.1 in, or from 0.1 in to 0.11 in, or from 0.11 in to 0.12 in, or from 0.12 in to 0.13 in, or from 0.13 in to 0.14 in, or from 0.14 in to 0.15 in, or from 0.15 in to 0.16 in, or from 0.16 in to 0.17 in, or from 0.17 in to 0.18 in, or from 0.18 in to 0.19 in, or from 0.19 in to 0.20 in, or from 0.20 in to 0.21 in, or from 0.21 in to 0.22 in, or from 0.22 in to 0.23 in, or from 0.23 in to 0.24 in, or from 0.24 in to 0.25 in, or from 0.25 in to 0.26 in, or from 0.26 in to 0.27 in, or from 0.27 in to 0.28 in, or from 0.28 in to 0.29 in, or from 0.29 in to 0.30 in, or any combination thereof. According to some embodiments, the single-conduit injector 140 may be comprised of steel, or stainless steel, or iron, or nickel, or titanium, or copper, or brass, or ceramic, or glass, or a combination thereof.

Referring again to FIG. 7A, according to some embodiments, the inlet 142 diameter could be from 0.01 in to 1 in, or from 0.03 in to 0.16 in, or from 0.03 in to 0.125 in, or from 0.089 in to 0.125 in. The discharge 146 diameter could be from 0.1 in to 1 in, or from 0.25 in to 1.6 in, or from 0.35 in to 0.55 in. The outlet end 146 length could be from 0.1 in to 2 in, or from 0.1 in to 1 in or from 0.25 in to 0.5 in. The length of the converging section could be 0 in, or from 0.1 in to 1 in, or from 0.25 in to 1 in, or from 0.25 in to 0.5 in. The conduit tube 143 diameter could be from 0.1 in to 8 in, or from 0.2 in to 6 in, or from 0.25 in to 2 in, or from 0.5 in to 1.5 in. The cylindrical conduit tube 143 length could be from 0.1 in to 8 in, or from 0.25 in to 6 in, or from 0.5 in to 4 in, or from 2 in to 4 in. The single-conduit injector 140 may be constructed of metal and may be polished to a 300 grit finish in its interior.

According to one or more embodiments described herein, lead may be melted and fed to the reactor, where at least a portion of the lead is oxidized by an oxidizing gas, into lead oxide. The oxidation reaction may be exothermic and produce different lead oxide morphologies depending upon reaction conditions. For example, alpha (tetragonal) lead oxide may be formed, which may be brown or red in color, and beta (orthorhombic) lead oxide may be formed, which may be green to yellow in color. Some lead may not be oxidized, referred to as free lead. The physical properties of the products may be customized based on process inputs.

In one or more embodiments, the product material of the presently described processes may comprise from 0 wt. % to 100 wt. % of orthorhombic lead monoxide. For example, the product material may comprise orthorhombic lead monoxide in an amount of from 0 wt. % to 10 wt. %, from 10 wt. % to 20 wt. %, from 20 wt. % to 30 wt. %, from 30 wt. % to 40 wt. %, from 40 wt. % to 50 wt. %, from 50 wt. % to 60 wt. %, from 60 wt. % to 70 wt. %, from 70 wt. % to 80 wt. %, from 80 wt. % to 90 wt. %, from 90 wt. % to 100 wt. %, or any combination thereof.

In additional embodiments, the product material of the presently described processes may comprise from 0 wt. % to 100 wt. % of tetragonal lead monoxide. For example, the product material may comprise tetragonal lead monoxide in an amount of from 0 wt. % to 10 wt. %, from 10 wt. % to 20 wt. %, from 20 wt. % to 30 wt. %, from 30 wt. % to 40 wt. %, from 40 wt. % to 50 wt. %, from 50 wt. % to 60 wt. %, from 60 wt. % to 70 wt. %, from 70 wt. % to 80 wt. %, from 80 wt. % to 90 wt. %, from 90 wt. % to 100 wt. %, or any combination thereof.

According to additional embodiments, the product material of the presently described processes may comprise from 0 wt. % to 100 wt. % of metallic lead (sometimes referred to as powdered lead or free lead when lead oxide is produced). For example, the product material may comprise metallic lead in an amount of from 0 wt. % to 10 wt. %, from 10 wt. % to 20 wt. %, from 20 wt. % to 30 wt. %, from 30 wt. % to 40 wt. %, from 40 wt. % to 50 wt. %, from 50 wt. % to 60 wt. %, from 60 wt. % to 70 wt. %, from 70 wt. % to 80 wt. %, from 80 wt. % to 90 wt. %, from 90 wt. % to 100 wt. %, or any combination thereof. The metallic lead may comprise at least 99 wt. %, 99.5 wt. %, 99.9 wt. %, or even 99.99 wt. % of a lead.

According to additional embodiments, the product material of the presently described processes may comprise a mixture of tetragonal lead monoxide, orthorhombic lead monoxide and metallic lead (otherwise referred to as free lead), in all proportions from 0 wt. % to 100 wt. for any single component. Typical requirements for lead acid battery active material specify a mixture of tetragonal lead monoxide as a major component, metallic lead as a minor component and orthorhombic lead monoxide permissible in small amounts. For example, the product may comprise of a mixture of tetragonal lead monoxide, orthorhombic lead monoxide and metallic lead in the wt. % proportions of: 90:0:10, 85:0:15, 80:0:20, 75:0:25, 70:0:30, 65:0:35, 90:5:5, 85:5:10, 80:5:15, 75:5:20, 70:5:25, 65:5:30, 60:5:35, 80:15:5, 75:15:10, 70:15:15, 65:15:20, 60:15:25, 55:15:30, 50:15:35, or in any other 3-component combination thereof. However, some lead acid battery technologies may require a mixture with a greater portion of orthorhombic lead monoxide. For example, the product may comprise of a mixture of tetragonal lead monoxide, orthorhombic lead monoxide and metallic lead, where the orthorhombic portion may comprise in an amount from 15 wt. % to 20 wt. %, 20 wt. % to 25 wt. %, 25 wt. % to 30 wt. %, 30 wt. % to 35 wt. %, 35 wt. % to 40 wt. %, 40 wt. % to 45 wt. %, 45 wt. % to 50 wt. %, or any combination thereof.

According to additional embodiments, the product material of the presently described processes may comprise from 0 wt. % to 100 wt. % of lead monoxide. For example, the product material may comprise lead oxide in an amount of from 0 wt. % to 10 wt. %, from 10 wt. % to 20 wt. %, from 20 wt. % to 30 wt. %, from 30 wt. % to 40 wt. %, from 40 wt. % to 50 wt. %, from 50 wt. % to 60 wt. %, from 60 wt. % to 70 wt. %, from 70 wt. % to 80 wt. %, from 80 wt. % to 90 wt. %, from 90 wt. % to 100 wt. %, or any combination thereof.

According to additional embodiments, the product material of the presently described processes may comprise BET surface area of from 0.1 m$^2$/g to 3.0 m$^2$/g.

According to additional embodiments, the product material of the presently described processes may have acid absorption of from 100 mg $H_2SO_4$/g PbO to 300 $H_2SO_4$/g PbO, such as 140 $H_2SO_4$/g PbO to 260 $H_2SO_4$/g PbO.

It has been discovered that the introduction of a molten metal-containing material into a molten material injector device 300 using a molten material pump 165 may induce variation in mass flow rate and head pressure, leading to variation in the size and quality of metal or metal oxide particles produced in a reactor. As such, in one or more embodiments, as depicted in FIGS. 5 and 10, molten material reservoir is utilized to control the head pressure of the molten metal-containing material. The molten metal-containing material may pass through a reservoir 161 before entering the molten material injector device 300. The reservoir 161 may comprise a pipe or other vessel. For example, the reservoir 161 may comprise a pipe having an internal size of 6.00 to 12 inches in diameter and a length of from 1 to 600 inches. The top of the reservoir 161 may be open to the atmosphere, while the bottom may be capped with a base 174. The center of the base 174 may be drilled and threaded to a diameter and thread size appropriate to receive the threaded single-conduit injector 140, as shown in FIG. 5. The single-conduit injector may be threaded into the base 174 of the reservoir 161 such that the inlets 142 of the single-conduit injector 140 are centered and, for example, 0.05 to 1.0 inches from the base 174.

The reservoir 161 may be heated to prevent the molten metal-containing material from freezing. The reservoir pipe may be enclosed with an insulated (e.g., 12-inch) duct with a hot gas inlet 180 located at the base and hot gas outlet 182 located at the top of the duct, opposite of the hot gas inlet 180. A molten material supply pipe 184 may extend through the lower portion of the duct opposite of the hot gas inlet 180 and supply molten metal-containing material to the reservoir 161. The molten material supply pipe 184 may be in fluid communication with the molten metal-containing material source 162, 262 or may be the same apparatus as the molten metal-containing material source 162, 262 of FIGS. 1 and 3.

The reservoir 161 may comprise a head pressure gauge 190, which may be utilized to measure the pressure of the molten metal-containing material at the inlet 142 of the molten material injector device 300. Additionally, a molten material volume monitor 150 (such as a molten material height or level monitor) is also utilized in the reservoir 161 to measure the height of the molten metal-containing material in the reservoir. The reservoir may be utilized to keep head pressure relatively constant by maintaining a relatively constant amount of molten metal-containing material in the reservoir (i.e., a relatively constant height of molten metal-containing material). For example, the rate or introduction of molten metal-containing material into the reaction zone 108 may not vary by more than 20%, more than 10%, more than 5%, or even by more than 1%.

The molten material volume monitor 150 may comprise any device operable to monitor the height of the molten metal-containing material in the reservoir 161. For example, and without limitation, pressure gauges and/or visual monitors may be utilized to monitor the height. The amount of molten metal-containing material in the reservoir 161 is then manipulated by adding additional molten metal into the reservoir 161 via molten material supply pipe 184. Suitable pressure gauges may include, without limitation, manometers, analog, or digital pressure gauges, LASER implemented monitoring devices, cameras, sonic or sonar devices, or piezo-electric devices.

According to one or more embodiments, a method for processing molten metal-containing materials into particles may include monitoring or setting a target head pressure for the molten material injector 140 by utilizing the head pressure gauge 190. For example, if a known head pressure is desired, the head pressure gauge 190 can be utilized to determine the approximate height of molten metal in the reservoir 161 that will produce such a head pressure. Thereafter, the target head pressure may be held by utilizing the molten material volume monitor 150 (such as a manometer) to control when and how much additional molten metal-containing material is passed into the reservoir 161. Thus, the height of material in the reservoir may be relatively constant, causing the head pressure to be relatively constant.

For example, according to at least one embodiment, the molten material volume monitor 150 in conjunction with the valve 164 controlling flow rate of molten metal-containing material, may maintain the molten flow into the reactor 101, 201 within 1% or even within 0.1%. A Reliable Pressure Drop Device such as a valve, orifice, atomizer, injector, nozzle or any other suitable device may be used to generate a repeatable pressure difference.

According to one or more embodiments, the molten material volume monitor 150 may comprise a manometer 152, such as shown in FIG. 5. The precise level of molten material can be maintained in the reservoir 161 by utilizing the difference in densities of the molten material, such as lead, and water. A manometer 152 calibrated in $\frac{1}{10}$'s of an inch of water column is inserted in the reservoir 161. A bleed valve 154 may be inserted in the tube 156 between the reservoir 161 and the water 158 in the manometer 152. The bleed valve 154 is initially left open to atmosphere. When the desired level of molten material has been reached in the reservoir 161, as measured on the head pressure gauge 190, the bleed valve 154 is closed. After the bleed valve 154 is closed, variations in the level in the reservoir 161 register a change in the height of the water 158 in the manometer. An electronic controller may monitor the manometer 152 and send a signal to open or close the valve 164 (increasing or decreasing mass flow rate of molten material through the molten material supply pipe 184).

For example, the density of lead is about 11 times that of water. Therefore, a 0.01 inch change in lead level results in 0.11 inch change on a gauge measuring in inches of water. The density effect magnifies small changes in lead levels into larger changes in water levels. The more sensitive manometer 152 is used to control the lead level in the reservoir 161 by sending a signal to the valve 164 attached to the melt kettle to maintain proper molten lead level in the reservoir.

According to one or more embodiments, the velocity, temperature, viscosity, density, and/or surface tension of the molten material feed stream may influence the atomization properties, such as droplet size. In some embodiments, the molten stream velocity entering the reactor 101, 201 may be increased by controlling the molten material stream head pressure, such that the mass flow rate exceeds the mass flow rate feed typical of a standard Barton Reactor. The relatively high pressure may also result in reduced molten particle size (i.e., increased atomization).

In one or more embodiments, a Barton reactor fitted with a single-conduit injector 140 may be capable atomizing a molten stream of lead into solid particles that are significantly smaller than droplet sizes achieved by a traditional Barton Reactor (i.e., one in which molten material enters in a non-atomized form). Therefore, a Barton reactor fitted with a single-conduit injector 140 may be capable of higher production rates when compared to conventional Barton technology.

Figure 11:
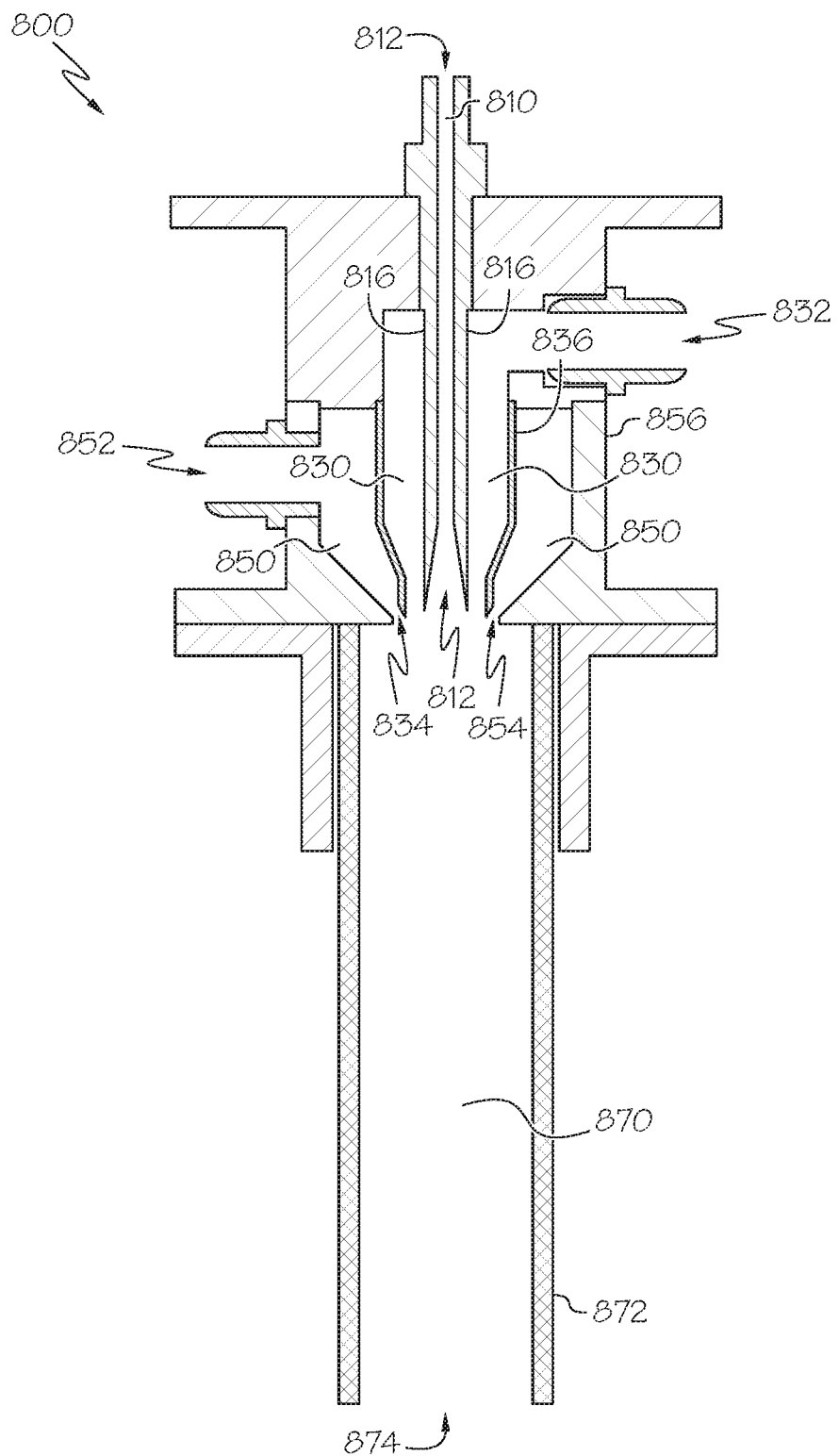
FIG. 11 schematically depicts a side view of a multi-conduit reactor, according to one or more embodiments described in this disclosure.

Now referring to FIG. 11, another system suitable for the formation of metallic or metal oxide powders is disclosed. According to one or more embodiments, a feed stream may be passed through a first conduit of the multi-conduit reactor, and a fluid stream may be passed through a second conduit of the multi-conduit reactor, where the feed stream and the fluid stream contact one another in a mixing zone and form a product stream which exits the multi-conduit reactor. Optionally, a quench stream may further enter the mixing zone through a third conduit. Various process parameters such as, but not limited to, stream compositions, stream temperatures, stream flow rates, and stream superficial velocities may affect the interaction between the feed stream and the fluid stream.

Referring to FIG. 11, a multi-conduit reactor 800 is schematically depicted. The multi-conduit reactor 800 may comprise at least a first conduit 810 and a second conduit 830 which lead to a mixing zone 870. The first conduit 810 may include an inlet 812 and an outlet 814, and the second conduit 830 may include an inlet 832 and an outlet 834. The first conduit 810 and the second conduit 830 may be divided from one another by a first tubular wall 816. As depicted in FIG. 11, the first conduit 810 and the second conduit 830 may form a coaxial geometry, such that the first conduit 810 is axially surrounded by the second conduit 830. The second conduit 830 may be defined by the first tubular wall 816 on its inner perimeter and by a second tubular wall 836 on its outer perimeter. According to some embodiments, the multi-conduit reactor 800 may additionally comprise a third conduit 850 defined by the second tubular wall 836 and a third tubular wall 856. The first conduit 810, the second conduit 830, and the third conduit 850 may form a multi-axial geometry where the second conduit 830 axially surrounds the first conduit 810 and the third conduit 850 axially surrounds the second conduit 830.

Figure 12:
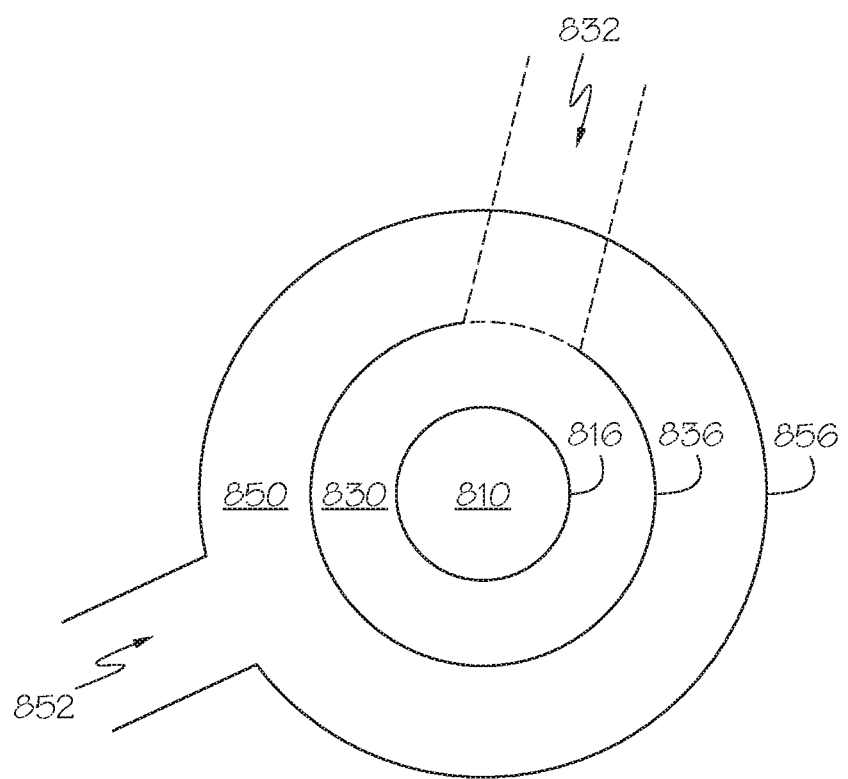
FIG. 12 schematically depicts a top view of the multi-conduit reactor of FIG. 11, according to one or more embodiments described in this disclosure.

According to some embodiments, at least a portion of the first tubular wall 816 may be circular in cross-section, such as the embodiment schematically depicted in FIG. 12. In such an embodiment, at least a portion of the first conduit may have a circular cross-section defined by the first tubular wall 816 as its outer perimeter. In some embodiments, the second tubular wall 836 may be circular in cross-section. In such an embodiment, at least a portion of the second conduit 830 may have a circular inner cross section and a circular outer cross section (i.e., ring shaped). At least a portion of the third conduit 850 may likewise have a circular inner cross-section and a circular outer cross-section, as depicted in FIG. 12.

According to some embodiments, the entirety of the first conduit may be tubular in shape, where a substantially straight pathway connects the first conduit inlet 812 and the first conduit outlet 814. The second conduit 830 may have an annular cross-section surrounding a portion of the first conduit, and may have an inlet 832 which emanates from a side of the multi-conduit reactor 800. In some embodiments, the third conduit 850 may also have an annular cross-section and have an inlet 852 which emanates from a side of the first reactor 800. FIG. 12 schematically depicts a top view of the axially aligned first conduit 810, second conduit 830, and third conduit 850, where the second conduit 830 has its inlet 832 emanating from a side of the multi-conduit reactor 800, and where the third conduit 850 has its inlet 852 emanating from a side of the multi-conduit reactor 800.

In one or more embodiments, the first conduit 810 may taper outward at or near its outlet 814, such that its cross-sectional area is greater at or near the outlet 814 than at or near the inlet 812 or area of the first conduit 810 between the inlet 812 and the outlet 814. The second conduit 830 and third conduit 850 may each taper inwards at or near their respective outlets 834, 854.

The first conduit 810, the second conduit 830, and the optional third conduit 850 may lead into a mixing zone 870, which may be substantially cylindrical in shape (i.e., having a circular cross-section.) The mixing zone 870 may be defined by a mixing zone wall 872. Product streams may flow out of the mixing zone 870, and the multi-conduit reactor 800, through the outlet 874.

According to various embodiments, the cross-sectional area of the first conduit 810 at the outlet 814 may be from 0.049 square inches to 0.45 square inches. For example, the cross-sectional area of the first conduit 810 at the outlet 814 may be from 0.049 square inches to 0.1 square inches, from 0.1 square inches to 0.2 square inches, from 0.2 square inches to 0.3 square inches, or from 0.3 square inches to 0.4 square inches. The first conduit 810 may be tapered such that the cross-sectional area of the first conduit 810 at the outlet 814 is greater than the cross-sectional area of the first conduit 810 at or near the inlet 812. For example, the cross-sectional area of the first conduit 810 at or near the inlet 812 may be from 0.049 square inches to 0.2 square inches, such as from 0.049 square inches to 0.1 square inches, from 0.1 square inches to 0.15 square inches, or from 0.15 square inches to 0.2 square inches.

The cross-sectional area of the second conduit 830 at the outlet 834 may be from 0.49 square inches to 7.1 square inches. For example, the cross-sectional area of the second conduit 830 at the outlet 834 may be from 0.49 square inches to 2 square inches, from 2 square inches to 4 square inches, from 4 square inches to 7.1 square inches, or from 0.5 square inches to 1.5 square inches. The second conduit 830 may be tapered such that the cross-sectional area of the second conduit 830 at the outlet 834 is less than the cross-sectional area of the second conduit 830 at or near the inlet 832. For example, the cross-sectional area of the second conduit 830 at or near the inlet 832 may be from 0.78 square inches to 7.1 square inches, such as from 0.78 square inches to 2 square inches, 2 square inches to 4 square inches, from 4 square inches to 7.1 square inches, or from 2.5 square inches to 3 square inches.

The cross-sectional area of the third conduit 850 at the outlet 854 may be from 0.5 square inches to 20 square inches. For example, the cross-sectional area of the first conduit 850 at the outlet 854 may be from 0.5 square inches to 5 square inches, from 5 square inches to 10 square inches, from 10 square inches to 15 square inches, from 15 square inches to 20 square inches, or from 0.5 square inches to 1.5 square inches. The third conduit 850 may be tapered such that the cross-sectional area of the third conduit 850 at the outlet 854 is less than the cross-sectional area of the third conduit 850 at or near the inlet 852. For example, the cross-sectional area of the third conduit 850 at or near the inlet 852 may be from 3 square inches to 20 square inches, such as from 8 square inches to 9.5 square inches, from 3 square inches to 7 square inches, from 7 square inches to 14 square inches, or from 14 square inches to 20 square inches.

According to one or more embodiments, the ratio of the cross-sectional area of the third conduit 850 at the outlet 854 to the cross-sectional area of the second conduit 830 at the outlet 834 is from 0 to 3, such as from 0 to 1, from 1 to 2, from 2 to 3, or from 0.7 to 1.1.

The various portions of the multi-conduit reactor 800 may be constructed from a wide variety of materials which are suitable for the thermal loads required by the methods described herein. For example, one or more portions of the multi-conduit reactor may be made of Inconel alloy (such as Inconel 601) or Haynes 230 alloy, which may be capable of withstanding temperatures of up to 2100° F.

It should be understood that the various streams may be characterized by their momentum flux, their superficial velocity, mass flowrate, etc. These properties, unless stated otherwise, are described with relation to the given stream as it enters the mixing zone 870 (i.e., at the feed stream outlet 814, the fluid stream outlet 834, and the quench stream outlet 854, respectively).

It should be appreciated that the design of the multi-conduit reactor 800 may be varied according to embodiments of the presently disclosed methods for processing metals and alloys disclosed herein. For example, the cross-sectional shape and/or relative size of one or more of the first conduit 810, the second conduit 830, and/or the third conduit 870 may be different from that depicted in FIG. 11 and described herein. For example, the conduits 810, 830, 850 may not share common walls with one another, and may have different shapes. Additionally, it should be appreciated that in some embodiments a third conduit 850 may not be included in the multi-conduit reactor 800. In additional embodiments, the conduit outlets 814, 834, 854 may be positioned on other portions of the mixing zone 870, and may not be adjacent to one another.

Now referring to FIG. 13, a reactor system 900 is depicted which includes, in addition to the multi-conduit reactor 800 of FIG. 11, additional stream pre-processing units such as a feed stream pre-processing unit 910, a fluid stream pre-processing unit 920, and a quench stream pre-processing unit 930. The pre-processing units 910, 920, 930 may change the temperature, pressure, or other characteristics of a given stream such a mass flow rate or superficial velocity. A feed stream pre-processing unit 910 may treat the feed stream 912 prior to the feed stream 912 entering the multi-conduit reactor 800. In one embodiment, the pre-processing unit 910 may heat the feed stream 912 to a temperature which liquefies the metals and/or alloys of the feed stream. In such embodiments, the feed stream pre-processing unit 910 may comprise a heater or heat exchanger. The fluid stream pre-processing unit 920 may treat the fluid stream 922 prior to the fluid stream 922 entering the multi-conduit reactor 800. In one embodiment, the fluid stream pre-processing unit 920 may heat the fluid stream 922 as well as pressurize the fluid stream 922. In such embodiments, the fluid stream pre-processing unit 920 may comprise a compressor, pump, or other pressure altering means, and a heater or heat exchanger. The quench stream pre-processing unit 930 may treat the quench stream 932 prior to the quench stream 932 entering the multi-conduit reactor 800. In one embodiment, the quench stream pre-processing unit 920 may cool the quench stream 932. For example, the quench stream pre-processing unit 930 may include a refrigeration means or heat exchanger.

Referring again to FIG. 11, in operation of the multi-conduit reactor 800, a feed stream may be passed through the first conduit 810 and a fluid stream may be passed through the second conduit 830. The feed stream may be contacted by the fluid stream in the mixing zone 870. Contact of the feed stream with the fluid stream may cause a chemical change and/or physical change in the feed stream, producing a product which exits the multi-conduit reactor 800 through the mixing zone outlet 874 in a product stream. A quench stream may also enter the mixing zone 870 via the third conduit 850 and mix with one or more of the feed stream, the fluid stream, or some product formed by the contact between the feed stream and the conduit stream.

In one or more embodiments, the feed stream may comprise one or more metal compounds, or alloys thereof. Throughout this disclosure, it should be understood that the term metal may include an alloy. According to one embodiment, the feed stream may comprise one or more metals in an amount of at least 50 wt. % of the total mass of the feed stream. In additional embodiments, the feed stream comprises one or more metals in an amount of at least 60 wt. %, at least 70 wt. %, at least 80 wt. %, at least 90 wt. %, at least 95 wt. %, at least 98 wt. %, or even at least 99 wt. % of the total mass of the feed stream. In some embodiments, the metal in the feed stream may consist essentially of, or consists of, a single metal or alloy species. For example, the metal or alloy in the feed stream may consist essentially of lead.

The feed stream may additionally include a carrier gas. The carrier gas may serve to move the feed stream in a direction generally towards the multi-conduit reactor 800 and into the mixing zone 870. In some embodiments, the carrier gas may be an inert gas, such as nitrogen. In additional embodiments, the carrier gas may be air or another gas that includes oxygen or other reactive species.

The feed stream may be heated to an elevated temperature, such that the metals or alloys of the feed stream are molten. For example, the feed stream may have a temperature greater than or equal to the melting point of the material of the feed stream. If more than one material is contained in the feed stream, the melting point of the feed stream may be considered to be the melting point of the lowest melting point material in the feed stream or the melting point of the feed stream may be considered as the eutectic melting point which is a temperature that is lower than the melting point for any single mixture constituent. In additional embodiments, the feed stream may be at a temperature greater than or equal to the melting point of the highest melting point material in the feed stream or greater than the eutectic melting point for mixtures comprising multiple molten metals. For example, if lead is processed in the multi-conduit reactor 800, the feed stream may have a temperature of at least about 621.5° F., which is the melting point of lead.

According to various embodiments, the feed stream may have a temperature of at least 50° F., at least 100° F., at least 150° F., at least 200° F., at least 250° F., at least 300° F., at least 350° F., at least 400° F., at least 450° F., at least 500° F., at least 550° F., at least 600° F., at least 650° F., at least 700° F., at least 750° F., at least 800° F., at least 850° F., at least 900° F., at least 950° F., at least 1000° F., at least 1050° F., at least 1100° F., at least 1150° F., at least 1200° F., at least 1250° F., at least 1300° F., at least 1350° F., at least 1400° F., at least 1450° F., or even at least 1500° F. For example, the feed stream may have a temperature of from 400° F. to 1200° F., such as from 500° F. to 1000° F., from 600° F. to 800° F., or from 650° F. to 750° F. In additional embodiments, the feed stream may have a temperature of at least the melting point of any of the metals or alloys identified herein or the feed stream may have a eutectic melting point temperature of any metal or metalloid mixtures or metal alloys.

The feed stream may have a superficial velocity of from 0.1 ft/s to 100 ft/s. For example, the superficial velocity of the feed stream may be at least 0.1 ft/s, at least 0.5 ft/s, at least 1 ft/s, at least 5 ft/s, at least 10 ft/s, or at least 30 ft/s, such as from 0.1 ft/s to 1 ft/s, from 1 ft/s to 10 ft/s, from 10 ft/s to 50 ft/s, or from 50 ft/s to 100 ft/s.

The feed stream may have a mass flowrate of from 0.2 lbs/s to 10 lbs/s. For example, the mass flowrate of the feed stream may be at least 0.2 lbs/s, at least 0.5 lbs/s, at least 1 lbs/s, at least 3 lbs/s, or at least 5 lbs/s, such as from 0.2 lbs/s to 1 lbs/s, from 1 lbs/s to 3 lbs/s, from 3 lbs/s to 5 lbs/s, from 5 lbs/s to 7 lbs/s, or from 7 lbs/s to 10 lbs/s.

The fluid stream may comprise one or more chemical species in a gas phase. According to some embodiments, the fluid stream may comprise a combustible gas, such as oxygen. For example, the fluid stream may comprise, consist essentially of, or consist of air. In one or more embodiments, the fluid stream may comprise oxygen in an amount of at least 5 wt. % of the total mass of the fluid stream. In additional embodiments, the fluid stream may comprise oxygen in an amount of at least 10 wt. %, at least 15 wt. %, at least 20 wt. %, at least 25 wt. %, at least 30 wt. %, at least 40 wt. %, at least 50 wt. %, at least 60 wt. %, at least 70 wt. %, at least 80 wt. %, at least 90 wt. %, or even at least 95 wt of the total mass of the fluid stream.

In other embodiments, the fluid stream contains little or no combustible gas species. The fluid stream may not be chemically reactive with the feed stream. For example, the feeds stream may comprise, consist essentially of, or consist of inert gases such as nitrogen. In one or more embodiments, the fluid stream may comprise inert gas, such as nitrogen, in an amount of at least 5 wt. % of the total mass of the fluid stream. In additional embodiments, the fluid stream may comprise oxygen in an amount of at least 10 wt. %, at least 15 wt. %, at least 20 wt. %, at least 25 wt. %, at least 30 wt. %, at least 40 wt. %, at least 50 wt. %, at least 60 wt. %, at least 70 wt. %, at least 80 wt. %, at least 90 wt. %, or even at least 95 wt of the total mass of the fluid stream. In additional embodiments, the fluid stream may comprise oxygen in an amount of less than or equal to 10 wt. % of the total mass of the fluid stream. For example, the fluid stream may comprise oxygen in an amount of less than or equal to 7.5 wt. %, less than or equal to 5 wt. %, less than or equal to 4 wt. %, less than or equal to 3 wt. %, less than or equal to 2 wt. %, or even less than or equal to 1 wt. % of the total mass of the fluid stream.

The fluid stream may be at an ambient temperature, or may be heated to an elevated temperature. According to various embodiments, the fluid stream may be heated and have a temperature of at least 100° F., at least 150° F., at least 200° F., at least 250° F., at least 300° F., at least 350° F., at least 400° F., at least 450° F., at least 500° F., at least 550° F., at least 600° F., at least 650° F., at least 700° F., at least 750° F., at least 800° F., at least 850° F., at least 900° F., at least 950° F., at least 1000° F., at least 1050° F., at least 1100° F., at least 1150° F., at least 1200° F., at least 1250° F., at least 1300° F., at least 1350° F., at least 1400° F., at least 1450° F., or even at least 1500° F. For example, the fluid stream may have a temperature of from 400° F. to 900° F., such as from 500° F. to 800° F., from 600° F. to 700° F., or from 500° F. to 650° F. In other embodiments, the fluid stream may have a temperature of from about 0° F. to 100° F., such as from 50° F. to 90° F., or from 60° F. to 80° F.

The fluid stream may have a superficial velocity of from 100 ft/s to 2500 ft/s. For example, the superficial velocity of the fluid stream may be at least 200 ft/s, at least 500 ft/s, at least 1000 ft/s, at least 1500 ft/s, or at least 2000 ft/s, such as from 100 ft/s to 300 ft/s, from 300 ft/s to 500 ft/s, from 500 ft/s to 1000 ft/s, from 1000 ft/s to 2000 ft/s, or from 2000 ft/s to 2500 ft/s.

As described herein, the feed stream is passed through the first conduit 810 of the multi-conduit reactor 800 and the fluid stream is passed through the second conduit 830 of the multi-conduit reactor 800, where the feed stream and the fluid stream contact one another in the mixing zone 870. In one or more embodiments, the contacting of the fluid stream with the feed stream may atomize some or all materials of the feed stream.

Figure 14:
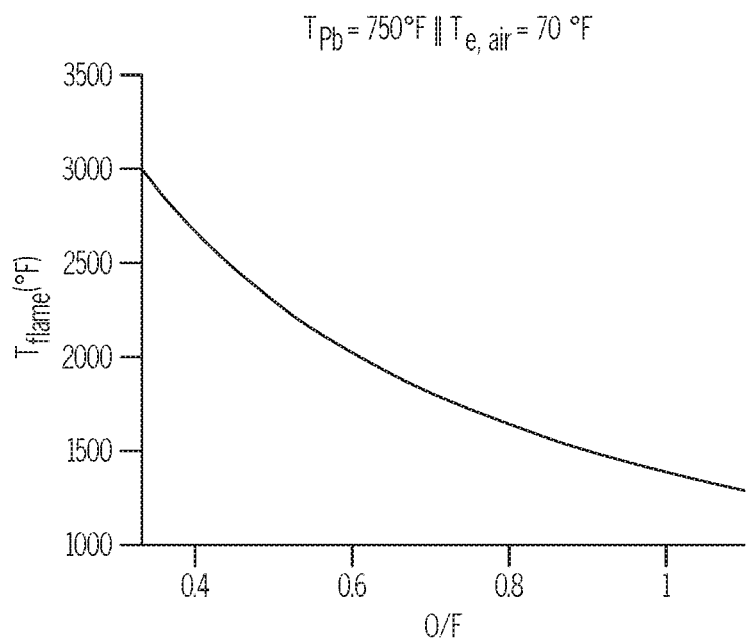
FIG. 14 depicts a mathematical model relevant to producing metal-containing particles in a multi-conduit injector, according to one or more embodiments described in this disclosure.

In one or more embodiments, the characteristics of the atomization of the materials in the feed stream may be a function of the momentum flux ratio. For example, the particle size may be correlated to the momentum flux ratio. As used herein, the momentum flux ratio is the ratio of the momentum flux of the fluid stream to the momentum flux of the feed stream. The momentum flux ratio can be represented by Equation 1, where M represents the momentum flux ratio, $\rho_{Fluid}$ is the density of the feed stream, $U_{Fluid}$ is the superficial velocity of the feed stream, $\rho_{Feed}$ is the density of the feed stream, and $U_{Feed}$ is the superficial velocity of the feed stream.

$$M = \frac{\rho_{Fluid} U_{Fluid}^2}{\rho_{Feed} U_{Feed}^2} \quad \text{Equation 1}$$

Without being bound by any particular theory, the momentum flux ratio may be correlated to the characteristics of the atomization by the Weiss & Worsham model (available in the publication by Malcom Weiss and Charles Worsham, entitled Atomization in High Velocity Airstreams, Esso Research and Engineering Co., Linden N.J, 1959), allowing for a desired atomization to be achieved by selection of the superficial velocity of the feed stream and the superficial velocity of the fluid stream. However, it should be understood that other models may be suitable for various reactor geometries and designs, where the Reynolds Number and/or Weber Number of one or more of the streams varies. According to one or more embodiments, the momentum flux ratio may be from 0.3 to 48. In additional embodiments, the momentum flux ratio may be from 0.1 to 100, such as from 0.1 to 1, from 1 to 5, from 5 to 25, from 25 to 50, from 50 to 75, or from 75 to 100.

According to one or more embodiments, the feed stream may be atomized into droplets having a Sauter Mean Diameter of less than or equal to 1 mm. For example, the Sauter Mean Diameter of the atomized droplets may be less than or equal to 750 microns, less than or equal to 500 microns, less than or equal to 250 microns, or even less than or equal to 100 microns, such as from 1 micron to 25 microns, from 25 microns to 100 microns, from 100 microns to 500 microns, from 500 microns to 1000 microns, or from 10 micron to 15 microns.

The contacting of the feed stream with the fluid stream may also cause a combustion reaction, particularly in embodiments where the fluid stream comprises oxygen. The combustion reaction may form metal oxides from the one or more metals or alloys of the feed stream. The oxidation of these metals or alloys may be exothermic, and may release heat sufficient to maintain a flame temperature in the mixing zone 870 of the multi-conduit reactor 800 which allows for the perpetual continuation of the combustion reaction. The flame temperature may be greater than the melting point of the metal or alloy in the feed stream (or even much greater than (e.g., at least 100° F. greater than) the melting point of the metal or alloy in the feed stream, but within the operating temperatures permitted by the materials of the multi-conduit reactor 800. Additionally, in the flame temperature may be below a temperature which would form oxides of nitrogen.

According to some embodiments, the flame temperature in the mixing zone 870 may be a function of the ratio of gas from the fluid stream to metal or metal alloy from the feed stream. Since the flame temperature may be controlled by adjusting the ratio of gas from the fluid stream to metal or metal alloy from the feed stream, the ratio of gas from the fluid stream to metal or metal alloy from the feed stream may be selected such that the flame temperature meets the operation parameters discussed herein, such as being greater than the melting point of the metal but less than a temperature not suitable for the materials of the reactor and a temperature which oxidizes nitrogen. For example, if lead is contained in the feed stream, the ratio of gas from the fluid stream to lead in the feed stream may be from 0.3 to 4.5, such as from 0.4 to 0.65, such that the flame temperature is from 1700° F. to 3000° F. FIG. 14 depicts an example relationship between the flame temperature and the ratio of gas to metal. According to one or more additional embodiments, the ratio of gas from the fluid stream to metal or metal alloy from the feed stream may be from 0.25 to 10, such as from 0.25 to 1, from 1 to 2, from 2 to 4, from 4 to 6, from 6 to 8, or from 8-10. As described herein, the ratio of gas from the fluid stream to metal or metal alloy from the feed stream is a weight basis measurement.

Figure 15:
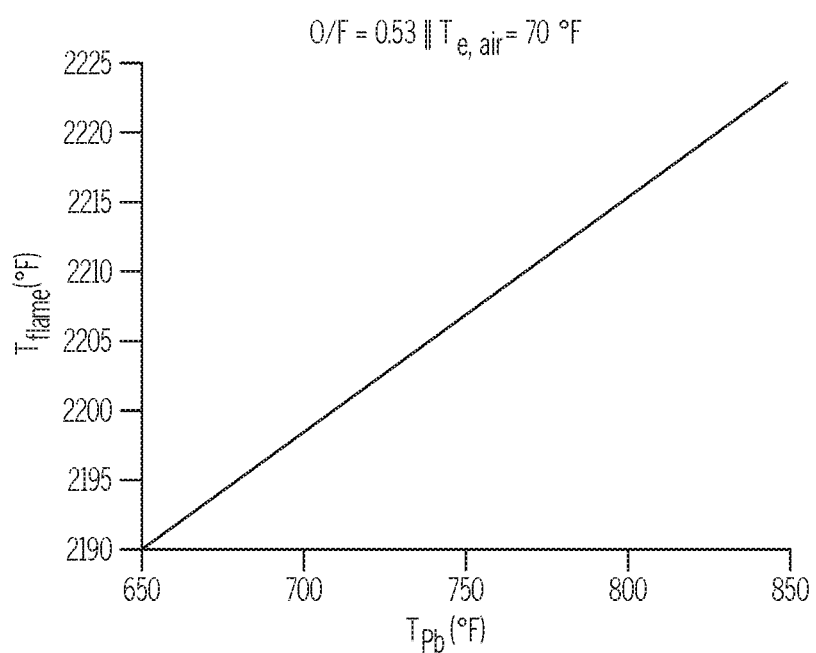
FIG. 15 depicts another mathematical model relevant to producing metal-containing particles in a multi-conduit injector, according to one or more embodiments described in this disclosure.
Figure 16:
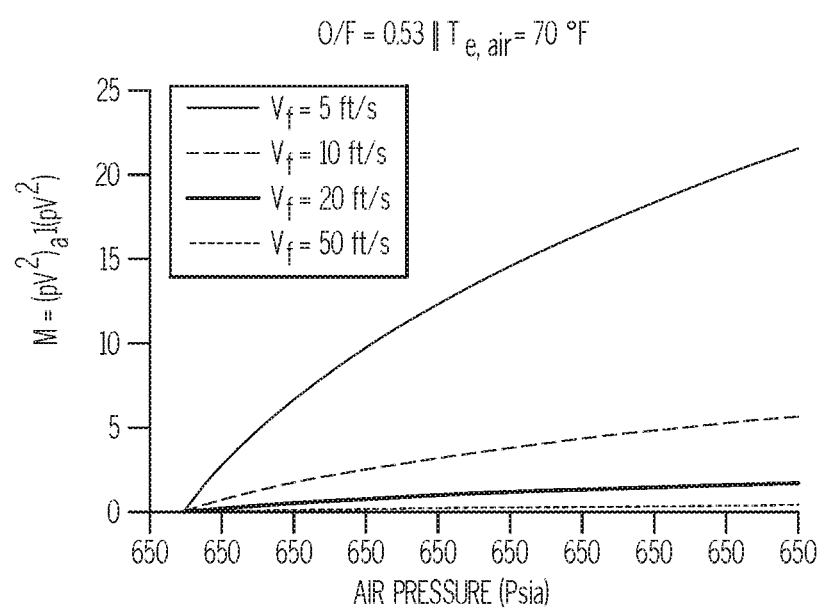
FIG. 16 depicts another mathematical model relevant to producing metal-containing particles in a multi-conduit injector, according to one or more embodiments described in this disclosure.

In addition to the ratio of oxygen to metal, in some embodiments, the temperature of the feed stream and/or the temperature of the fluid stream may affect the flame temperature. In general, the flame temperature may rise with increasing feed stream temperatures and/or increasing fluid stream temperatures. FIG. 15 depicts an example relationship between the flame temperature and the feed stream temperature. Moreover, FIG. 16 depicts the momentum ratio when plotted against pressure, where each line represents a liquid molten metal velocity. The lead velocity has a significant impact on momentum ratio base on the data of FIG. 16. As such, in some embodiments, about 5 ft/s molten metal velocity may be desirable so that momentum ratio is maximized while the flowrate of molten metal is still reasonable high.

In one or more embodiments, the ratio of the mass flowrate of the feed stream to the mass flowrate of the fluid stream may be from 0.05 to 0.5, such as from 0.2 to 0.3, from 0.3 to 0.4, or from 0.4 to 0.5.

In some embodiments, the multi-conduit reactor 800 may comprise a supplemental heating source in the mixing zone. The supplemental heating source may be utilized to ignite the combustion reaction. Once the combustion reaction begins, the flame temperature may be held without supplemental heating as long as adequate fuel (i.e., the metal or alloy from the feed stream) and oxygen is supplied. The supplemental heating source may comprise one or more of an ignition system, a burner, or any other apparatus suitable for supplying heat or a flame.

According to additional embodiments, a quench stream may enter the mixing zone 870 via the third conduit 850 and react with the components of the feed stream. Without being bound by theory, the quench stream may change one or more characteristics of the metal or metal oxide in the product stream, and may aid in cooling the product stream to a temperature below the melting point of the metal or alloy in the product stream, forming solids. The quench stream may alter the crystal structure of the components of the product stream. Without being bound by theory, it is believed that the rate of cooling of the product stream may affect the crystal structure of the metal, alloy, or metal oxide. The crystal structure may determine the color of the metal in the feed stream, so color of the product stream may be a controllable property in some embodiments.

In some embodiments, the quench stream may change the oxidation state the metals in the product stream from what they would have been had the quench stream not been present. For example, a quench stream that comprises oxygen may raise the oxidation state of a metal in the product stream.

The quench stream may comprise one or more chemical species in a gas phase. According to some embodiments, the quench stream may comprise a combustible gas, such as oxygen. For example, the quench stream may comprise, consist essentially of, or consist of air. In one or more embodiments, the quench stream may comprise oxygen in an amount of at least 5 wt. % of the total mass of the quench stream. In additional embodiments, the quench stream may comprise oxygen in an amount of at least 10 wt. %, at least 15 wt. %, at least 20 wt. %, at least 25 wt. %, at least 30 wt. %, at least 40 wt. %, at least 50 wt. %, at least 60 wt. %, at least 70 wt. %, at least 80 wt. %, at least 90 wt. %, or even at least 95 wt. % of the total mass of the quench stream.

In other embodiments, the quench stream contains little or no combustible gas species. The quench stream may not be chemically reactive with the feed stream. For example, the feeds stream may comprise, consist essentially of, or consist of inert gases such as nitrogen. In one or more embodiments, the quench stream may comprise inert gas, such as nitrogen, in an amount of at least 5 wt. % of the total mass of the quench stream. In additional embodiments, the quench stream may comprise oxygen in an amount of at least 10 wt. %, at least 15 wt. %, at least 20 wt. %, at least 25 wt. %, at least 30 wt. %, at least 40 wt. %, at least 50 wt. %, at least 60 wt. %, at least 70 wt. %, at least 80 wt. %, at least 90 wt. %, or even at least 95 wt of the total mass of the quench stream. In additional embodiments, the quench stream may comprise oxygen in an amount of less than or equal to 10 wt. % of the total mass of the quench stream. For example, the quench stream may comprise oxygen in an amount of less than or equal to 7.5 wt. %, less than or equal to 5 wt. %, less than or equal to 4 wt. %, less than or equal to 3 wt. %, less than or equal to 2 wt. %, or even less than or equal to 1 wt. % of the total mass of the quench stream.

The quench stream may be at an ambient temperature, or may be heated to an elevated temperature. In some embodiments, the quench stream may have a temperature of from about 0° F. to 100° F., such as from 50° F. to 90° F., or from 60° F. to 80° F. In some embodiments, the quench stream may be ambient air or cooled air.

In other embodiments, the quench stream may be heated and have a temperature of at least 100° F., at least 150° F., at least 200° F., at least 250° F., at least 300° F., at least 350° F., at least 400° F., at least 450° F., at least 500° F., at least 550° F., at least 600° F., at least 650° F., at least 700° F., at least 750° F., at least 800° F., at least 850° F., at least 900° F., at least 950° F., at least 1000° F., at least 1050° F., at least 1100° F., at least 1150° F., at least 1200° F., at least 1250° F., at least 1300° F., at least 1350° F., at least 1400° F., at least 1450° F., or even at least 1500° F. In additional embodiments, the quench stream may have a temperature of from −20° F. to 150° F.

In one or more embodiments, the quench stream may have a pressure of at least 15 psia. For example, the quench stream may have a pressure of at least 20 psia, at least 30 psia, at least 40 psia, or even at least 50 psia, such as from 15 psia to 100 psia, from 30 psia to 100 psia, or from 50 psia to 100 psia.

The quench stream may have a superficial velocity of from 100 ft/s to 2500 ft/s. For example, the superficial velocity of the quench stream may be at least 100 ft/s, at least 500 ft/s, at least 1000 ft/s, at least 1500 ft/s, or at least 2000 ft/s, such as from 100 ft/s to 500 ft/s, from 500 ft/s to 1000 ft/s, from 1000 ft/s to 1500 ft/s, from 1500 ft/s to 2000 ft/s, or from 2000 ft/s to 2500 ft/s.

The quench stream may have a mass flowrate of from 0.05 lbs/s to 50 lbs/s. For example, the mass flowrate of the quench stream may be at least 0.05 lbs/s, at least 0.5 lbs/s, at least 1 lbs/s, at least 5 lbs/s, or at least 10 lbs/s, such as from 0.05 lbs/s to 0.5 lbs/s, from 0.5 lbs/s to 1 lbs/s, from 1 lbs/s to 10 lbs/s, from 10 lbs/s to 30 lbs/s, or from 30 lbs/s to 50 lbs/s. For example, the quench stream may have a mass flowrate of from 0.2 lbs/s to 0.5 lbs/s The resulting components following the contacting of the feed stream and the fluid stream form a product stream, which exits the multi-conduit reactor. The product stream may comprise one or more powdered metals or alloys, or oxides thereof. According to one embodiment, if one or more of the fluid stream or the quench stream comprises oxygen, a metal oxide may be present in the product stream. Without being bound by theory, as disclosed above, it is believed that the size of the particles of the powder of the product stream may be a function of the momentum flux ratio, as explained previously in this disclosure. The metal, alloy, or oxide particles present in the product stream may have the same or similar size as the liquefied, atomized droplets of the feed stream when it is contacted by the fluid stream.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A method for making metal-containing particles, the method comprising:
    introducing a molten material into a reaction zone of a reactor system, wherein the molten material is introduced into an upper portion of the reaction zone, wherein the reaction zone comprises a circular cross-section, and wherein the molten metal is introduced into the reaction zone in a laminar flow;
    passing a process gas into the reaction zone in a direction substantially tangential to a sidewall of the reaction zone;
    contacting the process gas with the molten material in the reaction zone to form metal-containing particles.

2. The method of claim 1, wherein at least 99% of the particles are non-oxidized metals, metalloids or alloys.

3. The method of claim 2, wherein at least 95% of the particles are pure lead metal particles.

4. The method of claim 1, wherein the process gas is inert.

5. The method of claim 1, wherein the reaction zone operates at a temperature of at least 621° F.

6. The method of claim 1, further comprising separating the process gas from the formed metal-containing particles.

7. The method of claim 6, wherein the separating occurs in a separation zone comprising a frustum.

8. The method of claim 7, further comprising providing a cooling air supply to a separation section zone where separation of the metal-containing particles and process gas occurs.

9. The method of claim 7, wherein the process gas flows upwardly to exit the separation zone.

10. The method of claim 7, wherein the metal-containing particles flow downwardly to exit the separation zone.

11. The method of claim 1, wherein the process gas is an oxidizing agent and metal oxide particles are formed.

12. The method of claim 1, wherein a flow of gas impinges upon the laminar flow of molten material.

13. The method of claim 1, wherein the molten metal is dispensed in a hollow conical pattern, which is contacted by a gas annulus.

* * * * *